US012682611B2

(12) United States Patent
Qin et al.

(10) Patent No.: US 12,682,611 B2
(45) Date of Patent: Jul. 14, 2026

(54) IMAGE ACQUISITION MODEL TRAINING METHOD AND APPARATUS, IMAGE DETECTION METHOD AND APPARATUS, AND DEVICE

(71) Applicant: Tencent Technology (Shenzhen) Company Limited, Shenzhen (CN)

(72) Inventors: Chenchen Qin, Shenzhen (CN); Dasheng Wu, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 459 days.

(21) Appl. No.: 18/199,872

(22) Filed: May 19, 2023

(65) Prior Publication Data

US 2023/0298324 A1 Sep. 21, 2023

Related U.S. Application Data

(63) Continuation of application No. PCT/CN2022/121317, filed on Sep. 26, 2022.

(30) Foreign Application Priority Data

Oct. 15, 2021 (CN) .......................... 202111205913.3

(51) Int. Cl.
*G06V 10/774* (2022.01)
*G06V 10/48* (2022.01)
*G06V 10/77* (2022.01)
(52) U.S. Cl.
CPC ............ *G06V 10/774* (2022.01); *G06V 10/48* (2022.01); *G06V 10/7715* (2022.01)

(58) Field of Classification Search
CPC .. G06V 10/774; G06V 10/48; G06V 10/7715; G06V 10/82; G06N 3/04; G06N 3/08
See application file for complete search history.

(56) References Cited

U.S. PATENT DOCUMENTS 10,664,722 B1 * 5/2020 Sharma ..................... G06N 3/09
10,860,882 B2 * 12/2020 Piekniewski ............. G06T 3/00
(Continued)

FOREIGN PATENT DOCUMENTS

| CN | 106557759 A | 4/2017 |
| CN | 110097536 A | 8/2019 |

(Continued)

OTHER PUBLICATIONS

Min et al, IEEE, DOI: 10.1109/CVPR46437.2021.00296 (Year: 2021).*

(Continued)

*Primary Examiner* — Emily C Terrell
*Assistant Examiner* — Jordan McKenzie Elliott
(74) *Attorney, Agent, or Firm* — Morgan, Lewis & Bockius LLP

(57) ABSTRACT

An image acquisition model training method is contemplated. The method includes: acquiring a label image pair of a sample image; acquiring a predicted image pair of the sample image according to a first network model; adjusting the first network model based on the label image pair and the predicted image pair to obtain a second network model, so as to reduce a difference, obtained according to the second network model, between the predicted image pair and the label image pair; and determining the second network model as an image acquisition model in response to the second network model satisfying a training termination condition. By the above method, a heat map of an image in Hough space can be determined more quickly, and an image detec- (Continued)

tion result can be determined based on the heat map of the image in the Hough space, thereby improving the accuracy of subsequent analysis processing.

14 Claims, 17 Drawing Sheets

(56)                    References Cited

U.S. PATENT DOCUMENTS

| | | |
|---|---|---|
| 2018/0322660 A1 | 11/2018 | Smith |
| 2020/0097757 A1* | 3/2020 | Min ........................ G06N 3/045 |
| 2020/0285938 A1 | 9/2020 | Kim et al. |
| 2021/0015560 A1* | 1/2021 | Boddington ........... A61B 34/10 |
| 2022/0004762 A1* | 1/2022 | Kottenstette ......... G06V 20/176 |
| 2022/0019810 A1* | 1/2022 | Farber .................. G06N 3/0895 |
| 2022/0405954 A1* | 12/2022 | Ulasen ...................... G06T 7/70 |
| 2023/0298324 A1* | 9/2023 | Qin ........................ G06V 10/48 |
| | | 382/159 |
| 2024/0046498 A1* | 2/2024 | Phan .................. G06V 10/7715 |

FOREIGN PATENT DOCUMENTS

| | | |
|---|---|---|
| CN | 110781885 A | 2/2020 |
| CN | 111091132 A | 5/2020 |
| CN | 111639755 A | 9/2020 |
| CN | 112307940 A | 2/2021 |
| CN | 113379687 A | 9/2021 |
| CN | 114298268 A | 4/2022 |

OTHER PUBLICATIONS

Min et al, Convolutional Hough Matching Networks, submitted Mar. 31, 2021, Conference presentation Jun. 20-25, 2021, DOI: 10.1109/CVPR46437.2021.00296 (Year: 2021).*

Tencent Technology, Indian Office Action, IN Patent Application No. 202347079959, Jul. 7, 2025, 7 pgs.

Tencent Technology, WO, PCT/CN2022/121317, Nov. 25, 2022, 4 pgs.

Tencent Technology, IPRP, PCT/CN2022/121317, Apr. 16, 2024, 5 pgs.

Tencent Technology, ISR, PCT/CN2022/121317, Nov. 25, 2022, 2 pgs.

Tencent Technology, Extended European Search Report, EP Patent Application No. 22880135.3, Aug. 20, 2024, 8 pgs.

Fausto Milletari et al., "Hough-CNN: Deep Learning for Segmentation of Deep Brain Regions in MRI and Ultrasound", Computer Vision and Image Understanding, vol. 164, DOI: 10.1016/j.cviu.2017.04.002, Jan. 2016, 34 pgs.

M.W. Spratling, "A Neural Implementation of the Hough Transform and the Advantages of Explaining Away", Image and Vision Computing, vol. 52, DOI: 10.1016/j.imavis.2016.05.001, Aug. 2016, 14 pgs.

Yancong Lin et al., "Deep Hough-Transform Line Priors", Computer Vision—ECCV 2020, DOI 10.1007/978-3-030-58542-6_20, Jul. 2020, 18 pgs.

* cited by examiner

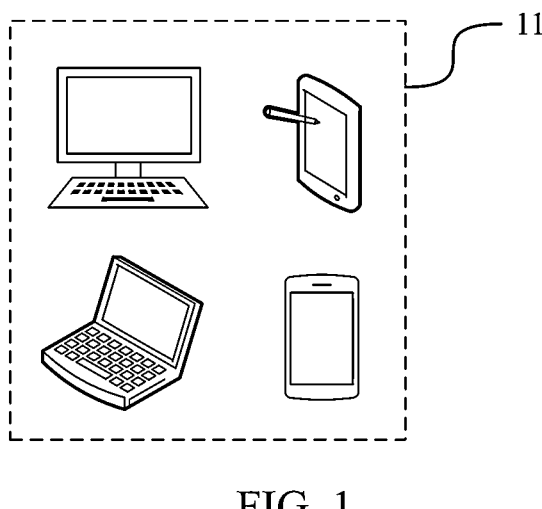

FIG. 1

| An electronic device acquires a label image pair of a sample image | 201 |

| The electronic device acquires a predicted image pair of the sample image according to a first network model | 202 |

| The electronic device adjusts the first network model based on the label image pair and the predicted image pair to obtain a second network model, so as to reduce a difference, obtained according to the second network model, between the predicted image pair and the label image pair | 203 |

| The electronic device determines the second network model as an image acquisition model in response to satisfying the training termination condition | 204 |

| First image spatial feature | → | Rectification network | → | Deep Hough transform network | → | First Hough spatial feature |

IMAGE ACQUISITION MODEL TRAINING METHOD AND APPARATUS, IMAGE DETECTION METHOD AND APPARATUS, AND DEVICE

CROSS-REFERENCE TO RELATED APPLICATIONS

This application is a continuation application of PCT Patent Application No. PCT/CN2022/121317, entitled "IMAGE ACQUISITION MODEL TRAINING METHOD AND APPARATUS, IMAGE DETECTION METHOD AND APPARATUS, AND DEVICE" filed on Sep. 26, 2022, which claims priority to Chinese Patent Application No. 202111205913.3, entitled "IMAGE ACQUISITION MODEL TRAINING METHOD AND APPARATUS, IMAGE DETECTION METHOD AND APPARATUS, AND DEVICE" filed on Oct. 15, 2021, all of which is incorporated by reference in its entirety.

FIELD OF THE TECHNOLOGY

Embodiments of this application relate to the field of image processing technologies, and in particular, to an image acquisition model training method and apparatus, an image detection method and apparatus, and a device.

BACKGROUND OF THE DISCLOSURE

With the continuous development of computers, the application of image detection technology has become more and more extensive, and there are more and more types of methods for the image detection technology. Hough transform is one of the methods for the image detection technology. Based on the principle of Hough transform, planes, lines, ellipses, and the like of an object in an image can be detected for subsequent analysis and processing.

SUMMARY

Embodiments of this application provide an image acquisition model training method and apparatus, an image detection method and apparatus, and a device, which can improve the accuracy of a heat map of an image in Hough space. The technical solutions include the following content:

In one aspect, an embodiment of this application provides an image acquisition model training method, which includes:

acquiring, by an electronic device, a label image pair of a sample image, the label image pair including a first label image and a second label image, the first label image being a heat map of the sample image in image space, and the second label image being a heat map of the sample image in Hough space;

acquiring, by the electronic device, a predicted image pair of the sample image according to a first network model, the predicted image pair including a first predicted image and a second predicted image, the first predicted image being a heat map of the sample image obtained by the first network model in the image space, and the second predicted image being a heat map of the sample image obtained by the first network model in the Hough space;

adjusting, by the electronic device, the first network model based on the label image pair and the predicted image pair to obtain a second network model, so as to reduce a difference, obtained according to the second network model, between the predicted image pair and the label image pair; and determining, by the electronic device, the second network model as an image acquisition model in response to the second network model satisfying a training termination condition.

In another aspect, an embodiment of this application provides an electronic device. The electronic device includes a processor and a memory, the memory stores at least one program code, and at least one program code is loaded and executed by the processor to enable the electronic device to implement any of the above image acquisition model training methods or implement any of the above image detection methods.

In another aspect, a non-transitory computer-readable storage medium is further provided. The computer-readable storage medium stores at least one program code. The program code is loaded or executed by a processor of an electronic device to enable the electronic device to implement any of the above image acquisition model training methods or implement any of the above image detection methods.

In another aspect, a computer program or a computer program product is further provided. The computer program or the computer program product includes at least one computer instruction, and the at least one computer instruction is loaded and executed to enable the electronic device to implement any of the above image acquisition model training methods or implement any of the above image detection methods.

The technical solutions provided in the embodiments of this application have the following beneficial effects:

According to the technical solutions provided by the embodiments of this application, the image acquisition model is obtained by training based on the heat map of the sample image in the Hough space and the heat map of the sample image in the image space, so that the image acquisition model learns a key point feature of the Hough space and a semantic feature of the image space, can quickly and accurately determine the heat map of an image in the Hough space, and can accurately determine an image detection result based on the heat map of the image in the Hough space, thereby improving the accuracy of subsequent analysis processing.

BRIEF DESCRIPTION OF THE DRAWINGS

In order to describe the technical solutions in the embodiments of this application more clearly, the drawings required to be used in descriptions about the embodiments will be simply introduced below. Apparently, the drawings in the following descriptions are only some embodiments of this application. Those of ordinary skill in the art may further obtain other drawings according to these drawings without creative work.

FIG. 1 is a schematic diagram of an implementation environment of an image acquisition model training method or an image detection method provided by an embodiment of this application.

FIG. 2 is a flowchart of an image acquisition model training method provided by an embodiment of this application.

DESCRIPTION OF EMBODIMENTS

Figure 3:
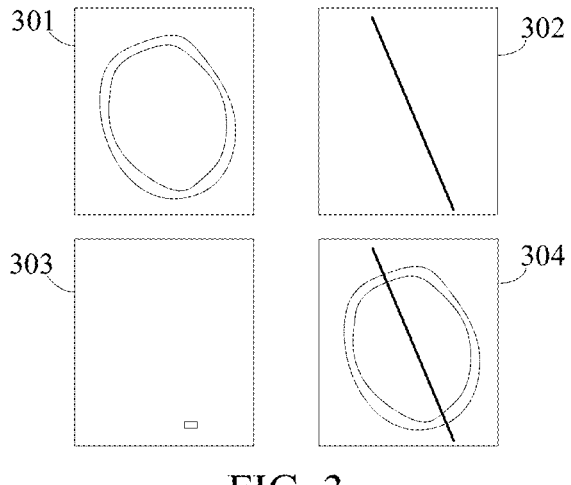
FIG. 3 is one schematic diagram of an image provided by an embodiment of this application.

To make the objectives, technical solutions, and advantages of the application clearer, implementations of the application will be further described in detail with reference to the accompanying drawings.

First, terms involved in the embodiments of this application are explained.

Image space is 3D geometric space of an image.

Hough space is polar coordinate space (also referred to as parameter space) of an image.

Hough transform is a feature extraction method, which gives equations of a line, an ellipse, a plane, and the like, performs voting in the polar coordinate space, and positions and detects a geometric pattern by detecting accumulated local peak points in the polar coordinate space. According to different equations, the Hough transform may be divided into a line Hough transform (LHT), a plane Hough transform (PHT), and an elliptic Hough transform (EHT).

A DHT network is a convolutional neural network (CNN) integrated with a Hough transform method. By using the DHT network, a feature of a sample image in Hough space is determined based on a feature of the sample image in image space to obtain a heat map of the sample image in the Hough space. The DHT network is divided into a 3-dimension deep Hough transform (3D DHT) network and a 2-dimension deep Hough transform (2D DHT) network. The 3D DHT network is used for processing a 3D sample image, and the 2D DHT network is used for processing a 2D sample image.

An IDHT network is a CNN integrated with an inverse Hough transform method. By using the IDHT network, a feature of a sample image in image space is determined based on a feature of the sample image in Hough space to obtain a heat map of the sample image in the image space. The IDHT network is divided into a 3-dimension inverse deep Hough transform (3D IDHT) network and a 2-dimension inverse deep Hough transform (2D IDHT) network. The 3D IDHT network is used for processing a 3D sample image, and the 2D IDHT network is used for processing a 2D sample image.

Detecting a plane of an object in an image based on the Hough transform principle is taken as an example, and the principle is that a point in image space is transformed into a plane in Hough space in a plane expression form by using the duality of points and planes, so as to obtain a heat map in the Hough space. A target plane in the image space is obtained by searching a peak point in the Hough space to obtain the plane of the object in the image.

In a related technology, each point in image space is often transformed into a heat map in Hough space based on the Hough transform principle by using an accumulator, so as to determine an image detection result based on the heat map of the Hough space, that is, to determine a plane, a line, and an ellipse of the object in the image. However, the accumulator is implemented based on a conventional mathematical transform mode, which needs to iterate parameters continuously, has low speed and low accuracy, and affects the accuracy of subsequent analysis and processing.

FIG. 1 is a schematic diagram of an implementation environment of an image acquisition model training method or an image detection method provided by an embodiment of this application. As shown in FIG. 1, the implementation environment includes an electronic device 11. The image acquisition model training method or the image detection method in the embodiment of this application may be performed by the electronic device 11. Exemplarily, the electronic device 11 may include at least one of a terminal device or a server.

The terminal device may be at least one of a smartphone, a game console, a desk computer, a tablet computer, an ebook reader, a moving picture experts group audio layer III (MP3) player, a moving picture experts group audio layer IV (MP4) player, and a laptop computer.

The server may be any one of an independent server, a server cluster composed of a plurality of servers, or a cloud computing platform and a virtualization center. No limits are made thereto in the embodiment of this application. The server may be in communication connection with the terminal device through a wired network or a wireless network. The server may have the functions of data processing, data storage, data transceiving, and the like. No limits are made thereto in the embodiment of this application.

Technical solutions of each optional embodiment of this application are implemented based on artificial intelligence (AI). The AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/ interaction system, and electromechanical integration. AI software technologies mainly include several major directions such as a computer vision (CV) technology, a speech processing technology, a natural language processing technology and machine learning/deep learning, autonomous driving, and smart transportation.

The CV technology is a science that studies how to use a machine to "see", and furthermore, it is machine vision that uses a camera and a computer to replace human eyes to perform recognition, measurement, and the like on a target, and further perform graphic processing, so that the computer processes the target into an image that is more suitable for human eyes to observe or to be transmitted to an instrument to detect. As a scientific discipline, CV studies related theories and technologies and attempts to establish an AI system that can acquire information from images or multi-dimensional data. The CV technology typically includes technologies such as image processing, image recognition, image semantic understanding, image retrieval, optical character recognition (OCR), video processing, video semantic understanding, video content/behavior recognition, 3D object reconstruction, 3D technology, virtual reality, augmented reality, synchronous positioning and map construction, autonomous driving, and smart transportation, and also includes common biometric recognition technologies such as face recognition and fingerprint recognition.

With the research and progress of AI technology, the AI technology has been studied and applied in a plurality of fields, for example, common smart homes, smart wearable devices, virtual assistants, smart speakers, smart marketing, unmanned driving, autonomous driving, unmanned aerial vehicles, robots, smart healthcare, smart customer service, Internet of vehicles, autonomous driving, smart transportation, and the like. Believing that with the development of technology, the AI technology will be applied in more fields and play a more and more important role.

The solutions provided by the embodiments of this application relate to technologies such as CV of AI, and are specifically described by the following embodiments.

Based on the above implementation environment, the embodiment of this application provides an image acquisition model training method. Taking the flowchart of the image acquisition model training method provided by the embodiment of this application shown in FIG. 2 as an example, the method is performed by the electronic device 11 shown in FIG. 1. As shown in FIG. 2, the method includes step 201 to step 204.

Step 201: An electronic device acquires a label image pair of a sample image.

The label image pair includes a first label image and a second label image, the first label image is a heat map of the sample image in image space, and the second label image is a heat map of the sample image in Hough space.

The embodiment of this application does not limit the sample image. Exemplarily, the sample image includes, but is not limited to, a brain image, a landscape image, a road image, a fetal image, a cell image, and the like. There are a plurality of sample images.

The first label image is a heat map of the sample image in the image space. A value of any pixel in the first label image characterizes a probability of the pixel on a target line, on a target ellipse, or on a target plane. The second label image is a heat map of the sample image in the Hough space. A value of any pixel in the second label image characterizes a probability of the pixel on a target line, on a target ellipse, or on a target plane.

Figure 20:
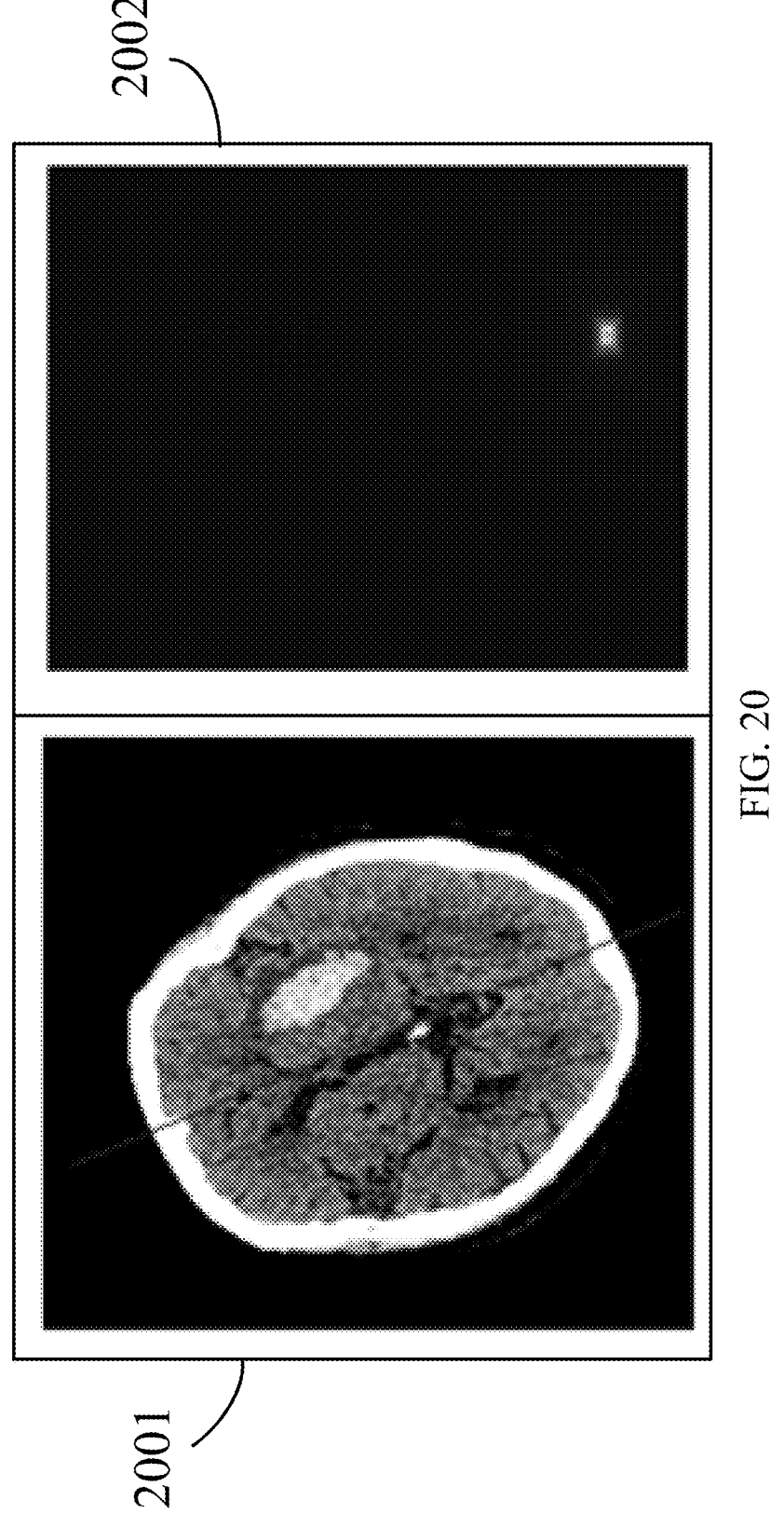
FIG. 20 is one schematic diagram of an image provided by an embodiment of this application.

Refer to FIG. 3 or FIG. 20, which is one schematic diagram of an image provided by an embodiment of this application. An image indicated by number 301 is a sample image. A heat map of the sample image 301 in image space is indicated by number 302. A heat map of the sample image 301 in Hough space is indicated by number 303. A rendering corresponding to number 303 is indicated by number 2002. An image indicated by number 304 is an image obtained after the sample image 301 is superposed with the heat map 302. A rendering corresponding to number 304 is indicated by number 2001.

Figure 4:
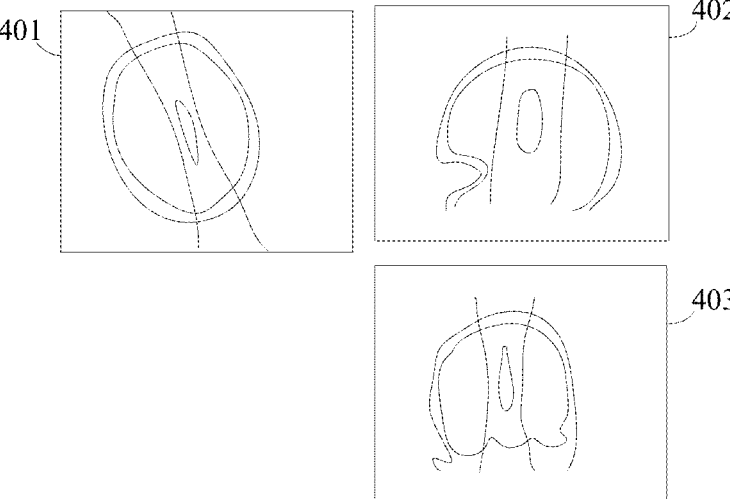
FIG. 4 is another schematic diagram of an image provided by an embodiment of this application.
Figure 21:
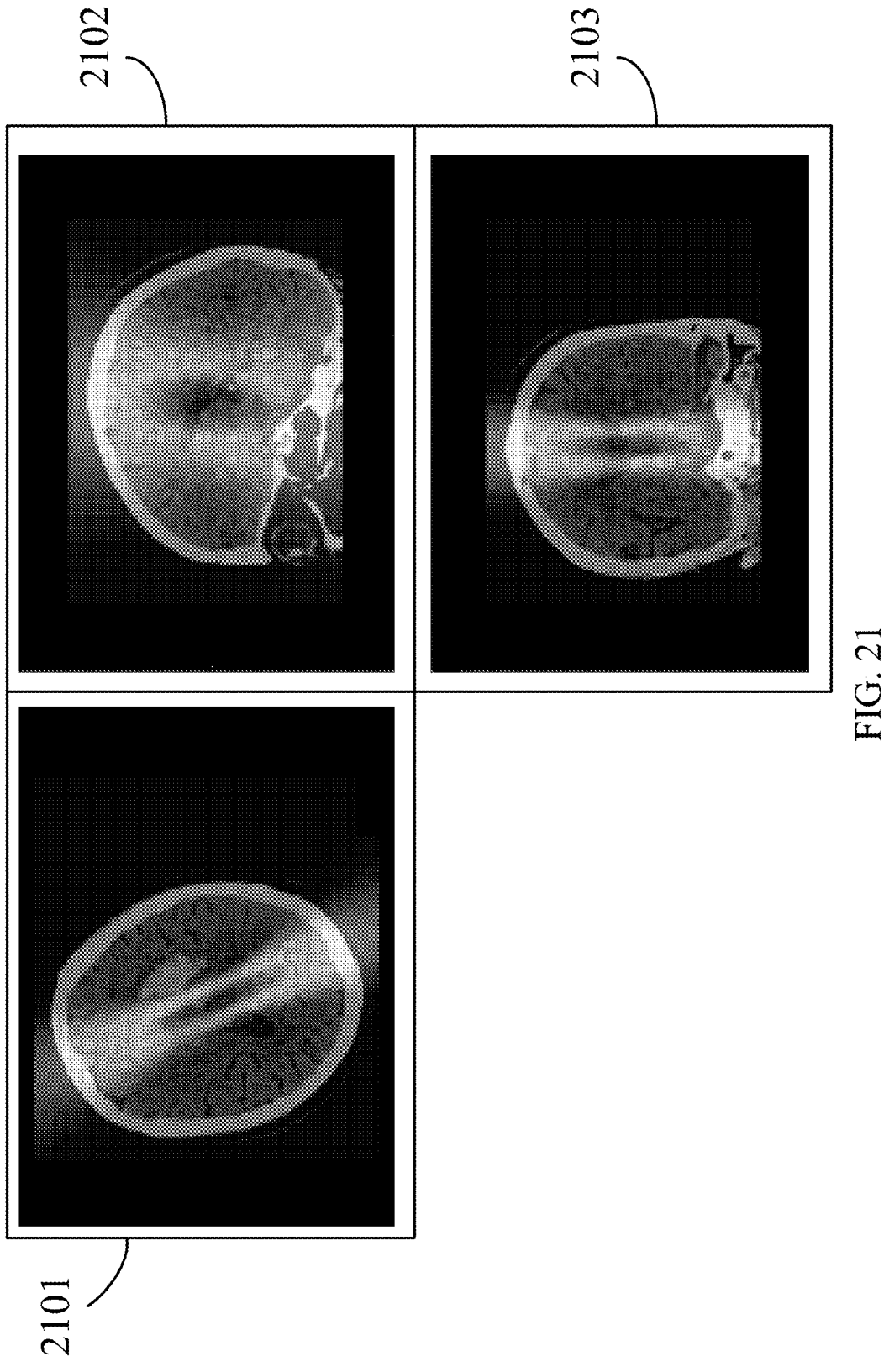
FIG. 21 is another schematic diagram of an image provided by an embodiment of this application.

Refer to FIG. 4 or FIG. 21, which is another schematic diagram of an image provided by an embodiment of this application. In practice, the heat map of the sample image 301 in the image space is a strip. An image indicated by number 401 is an image obtained after the sample image is superposed with the heat map of the sample image in the image space. The rendering corresponding to number 401 is indicated by number 2101. Comparing the image indicated by number 304 with the image indicated by number 401, it may be clearly seen that: in the image indicated by number 304, the heat map of the sample image 301 in the image space is a line. In the image indicated by number 401, the heat map of the sample image 301 in the image space is a strip. Both the images indicated by number 402 and number 403 are images obtained after the sample image is superposed with the heat map of the sample image in the image space. The rendering corresponding to number 402 is indicated by number 2102. The rendering corresponding to number 403 is indicated by number 2103. The three images indicated by number 401, number 402, and number 403 are images in three different perspectives.

Figures 5, 6:
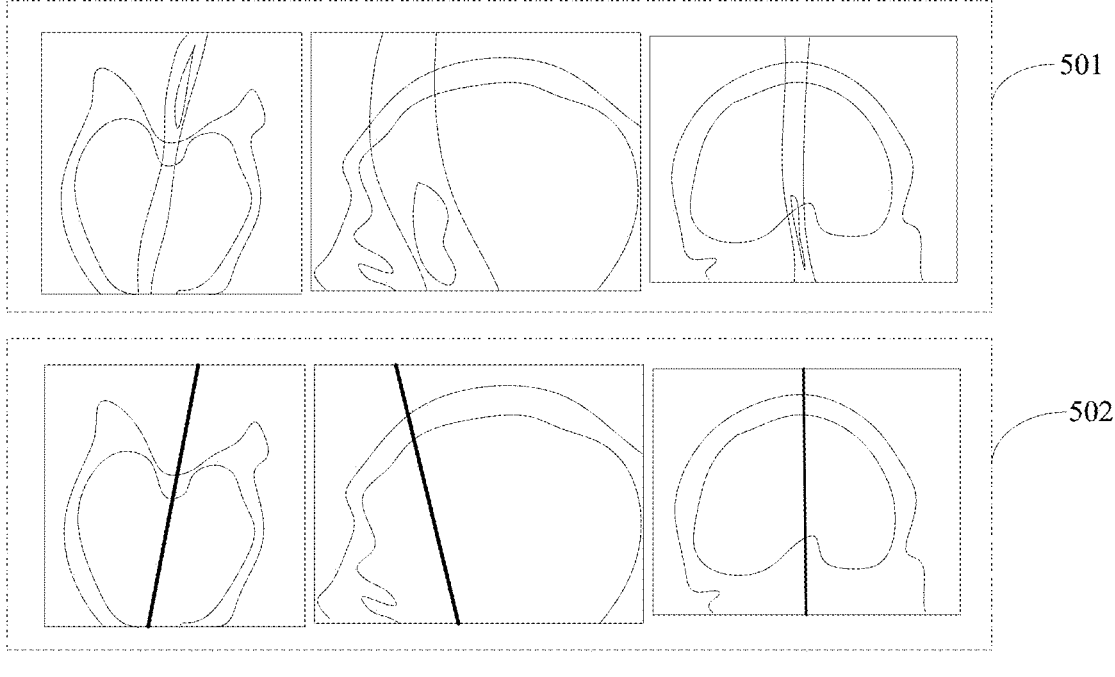
FIG. 5 is still another schematic diagram of an image provided by an embodiment of this application.
FIG. 6 is a schematic diagram of a fast deep Hough transform (DHT) network provided by an embodiment of this application.
Figure 22:
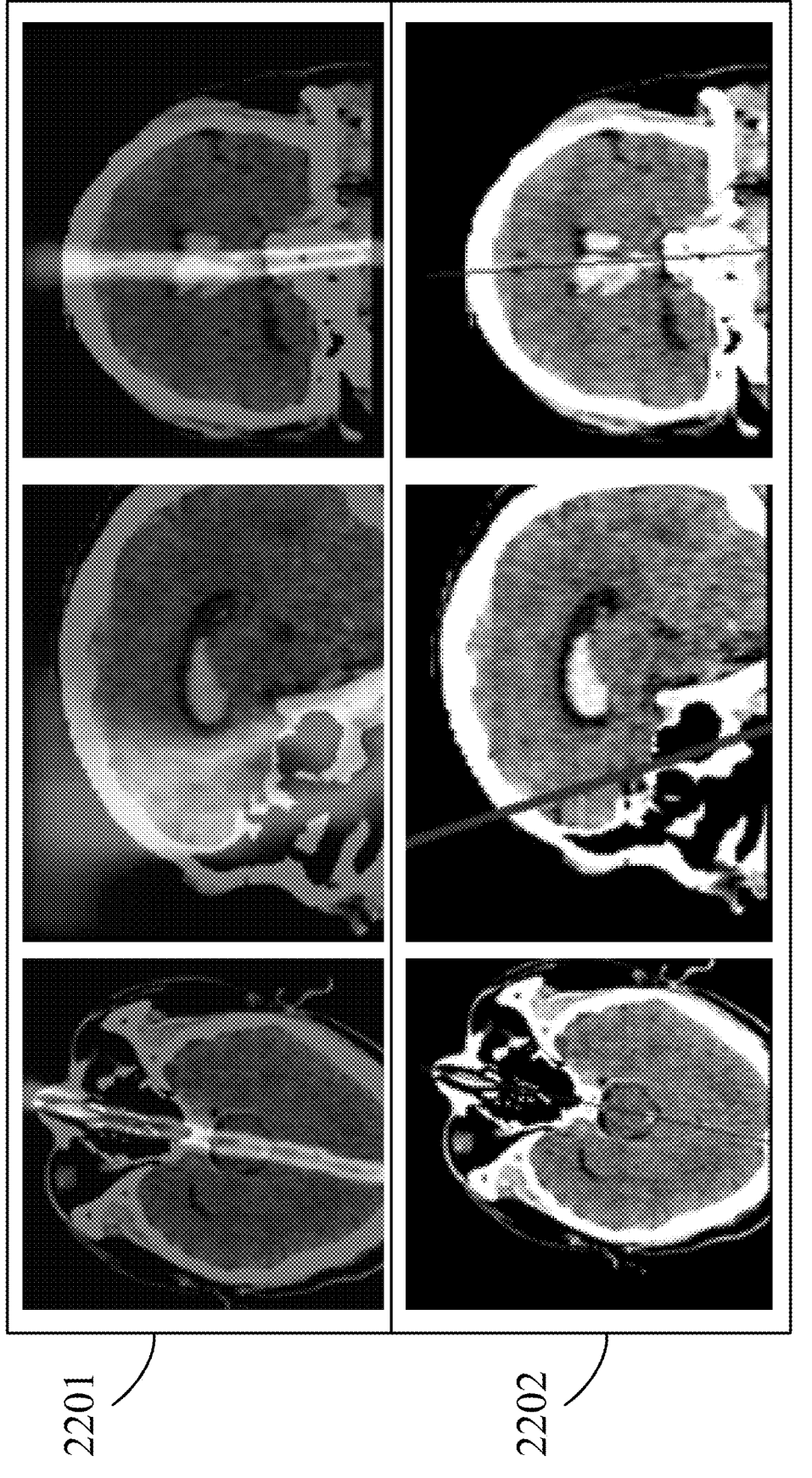
FIG. 22 is still another schematic diagram of an image provided by an embodiment of this application.

Refer to FIG. 5 or FIG. 22, which is still another schematic diagram of an image provided by an embodiment of this application. The three images indicated by number 501 are images after the heat map of the sample image in the image space is superposed with the sample image in different perspectives. A rendering corresponding to number 501 is indicated by number 2201. The three images indicated by number 502 are images after the heat map of the sample image in the image space is superposed with the sample image in different perspectives. A rendering corresponding to number 502 is indicated by number 2202.

Step 202: The electronic device acquires a predicted image pair of the sample image according to a first network model.

The predicted image pair includes a first predicted image and a second predicted image, the first predicted image is a heat map of the sample image obtained by the first network model in the image space, and the second predicted image is a heat map of the sample image obtained by the first network model in the Hough space. The first predicted image and the second predicted image are heat maps predicted by the first network model.

In the embodiment of this application, the sample image is input into the first network model, and the first network model outputs the first predicated image and the second predicted image. The first predicted image is a heat map of the sample image in the image space. A value of any pixel in the first predicted image characterizes a probability of the pixel on a target line, on a target ellipse, or on a target plane. The second predicted image is a heat map of the sample image in the Hough space. A value of any pixel in the second predicted image characterizes a probability of the pixel on a target line, on a target ellipse, or on a target plane.

Step 203: The electronic device adjusts the first network model based on the label image pair and the predicted image pair to obtain a second network model, so as to reduce a difference, obtained according to the second network model, between the predicted image pair and the label image pair.

In the embodiment of this application, the smaller the difference, obtained according to the second network model, between the predicted image pair and the label image pair, the higher the accuracy of a network model. Therefore, the network model is adjusted with a purpose of reducing the difference, obtained according to the network model, between the predicted image pair and the label image pair, which makes the adjusted network model more accurate. The difference between the predicted image pair and the label image pair refers to a difference between the first label image and the first predicted image and a difference between the second label image and the second predicted image. The reduction of the difference, obtained according to the second network model, between the predicted image pair and the label image pair refers to: the reduction of the difference, obtained according to the second network model, between the predicted image pair and the label image pair compared with the difference, obtained according to the first network model, between the predicted image pair and the label image pair.

In a possible implementation, a loss value of the first network model is calculated based on the label image pair and the predicted image pair, and a model parameter of the first network model is adjusted based on the loss value of the first network model to obtain a second network model, so as to reduce a difference, obtained according to the second network model, between the predicted image pair and the label image pair. The loss value of the first network model represents a difference, obtained by the first network model, between the predicted image pair and the label image pair.

Step 204: The electronic device determines the second network model as an image acquisition model in response to the second network model satisfying a training termination condition.

The embodiment of this application does not limit the satisfaction of the training termination condition. Exemplarily, the satisfaction of the training termination condition is to achieve a target number of times of training. A value of the target number of times of training may be flexibly set according to artificial experience or actual scenarios. For example, the target number of times of training is 200 times.

The electronic device determines the second network model as the image acquisition model in response to satisfying the training termination condition. The electronic device trains the second network model based on the sample image according to the methods of step 202 and step 203 in response to not satisfying the training termination condition and obtains the image acquisition model until the training termination condition is satisfied.

In a related art, the image acquisition model is often trained by using the heat map of the image in the image space, so that the image acquisition model can determine the heat map of the image in the image space by using a semantic feature of the image in the image space. However, due to limited consideration of factors, the accuracy of the image acquisition model is low.

In the embodiment of this application, considering that the sample image represents semantic information of the image, therefore, the heat map of the sample image in the image space represents the semantic feature of the image space. Because lines, planes, and the like of the image spatial feature correspond to the points of the Hough space, the heat map of the sample image in the Hough space represents a key point feature of the Hough space. Therefore, the image acquisition model is obtained by training based on the heat map of the sample image in the Hough space and the heat map of the sample image in the image space, so that the image acquisition model learns the key point feature of the Hough space and the semantic feature of the image space, which can not only determine the heat map of the image in the image space, but also quickly and accurately determine the heat map of the image in the Hough space. The convergence rate of the model can be accelerated by supervising the learning of the model in both the image space and the Hough space. Moreover, features of different space can be learned by training the image acquisition model by the method, so that the features of a plurality of spaces can be integrated when the heat map is generated, so that the image acquisition model learns related features, and meanwhile, the accuracy of the image acquisition model is further improved. Subsequently, an image detection result can be accurately determined based on the heat map of the image in the Hough space based on the image acquisition model, so as to improve the accuracy of subsequent analysis processing.

In a possible implementation, the operation that the electronic device acquires the predicted image pair of the sample image includes: the electronic device acquires a first image spatial feature of the sample image, and the first image spatial feature characterizes a feature of the sample image in the image space; the electronic device determines the first predicted image based on the first image spatial feature; the electronic device determines a first Hough spatial feature based on the first image spatial feature, and the first Hough spatial feature characterizes a feature of the sample image in the Hough space; and the second predicted image is determined based on the first Hough spatial feature.

In the embodiment of this application, the first image spatial feature of the sample image is extracted first according to the first network model. Then, in one aspect, upsampling is performed based on the first image spatial feature according to the first network model to obtain the first predicted image. In another aspect, Hough transform is performed based on the first image spatial feature according to the first network model to obtain the first Hough spatial feature. After that, upsampling is performed based on the first Hough spatial feature according to the first network model to obtain the second predicted image.

The first network model includes a DHT network. The DHT network is used for performing Hough transform on the first image spatial feature to obtain a first Hough spatial feature. When the sample image is a 2D sample image, the DHT network is a 2D DHT network. When the sample image is a 3D sample image, the DHT network is a 3D DHT network. Taking the 3D DHT network as an example, an operation principle of the 3D DHT network is introduced in detail.

In the embodiment of this application, when the sample image is a 3D sample image, the image acquisition model mainly detects a certain plane of the 3D sample image (such as a brain midline plane and a fetal standard plane). An expression of the plane in a rectangular coordinate system is $Ax+By+Cz+D=0$, and this expression may be converted into an expression in a polar coordinate system: $x \sin \varphi \cos \theta + y \sin \varphi \sin \theta + z \cos \varphi = \rho$. The feature of the sample image in the image space is $R^{H \times W \times D}$, and the feature of the sample image in the Hough space is $R^{\varphi \times \theta \times \rho}$. Where, A, B, C, and D are four parameters; x, y, and z are three variables; $\varphi$, $\theta$, and $\rho$ are three parameters; R is a real number, H is a height, W is a width, and D is a depth. Hough transform is to transform any point in the image space into one plane in the Hough space. In this way, various points in the image space is transformed into various planes in the Hough space, and various planes in the Hough space are accumulated to obtain a Hough key point heat map (that is, the heat map of the image in the Hough space). Maximum points in the Hough key point heat map correspond to $\varphi$ (that is, phi), $\theta$ (that is, theta), and $\rho$ (that is, rho). Based on the above information, the 3D DHT network realizes the Hough transform according to the following implementation A1 and implementation A2.

In the embodiment of this application, algorithms of the 3D DHT network includes a forward propagation algorithm of the 3D DHT network (see implementation A1) and a backward propagation algorithm of the 3D DHT network (see implementation A2).

The implementation A1 is the forward propagation algorithm of the 3D DHT network.

Input: volume, //a feature $R^{H \times W \times D}$ of the sample image in the image space;

phi, //a value range thereof is [phi_min, phi_max], and a sampling number is n_phi;

theta, //a value range thereof is [theta_min, theta_max], and a sampling number is n_theta;

rho, //a value range thereof is [rho_min, rho_max], and a sampling number is n_rho;

f. //planar equation;

Output: hough. //the feature$R^{\varphi \times \theta \times \rho}$ of the sample image in the Hough space;

An implementation algorithm is as follows:

function dht3d_forward (volume, hough_range, hough_size)//a forward propagation algorithm function of the 3D DHT network. The function includes three inputs: volume, hough_range, and hough_size; hough_range includes value ranges of phi, theta, and rho; hough_size includes sampling numbers of phi, theta, and rho;

hough$\leftarrow 0^{\varphi \times \theta \times \rho}$,//a null array with the size of n_phi× n_theta×n_rho is created as a feature hough of the sample image in the Hough space;

for (h, w, d) in mesh_grid (volume_size), //a pixel used for traversing the volume is created, and coordinates of the pixel is (h, w, d);

(x, y, z)$\leftarrow$(h, w, d), //coordinates of the pixel are transformed to change (h, w, d) into (x, y, z);

val$\leftarrow$volume[h, w, d], //a pixel value val of the pixel is acquired, and the value is volume (h, w, d);

for phi in phi_range, //phi is valued in [phi_min, phi_max] in sequence;

for phi in phi_range, //theta is valued in [theta_min, theta_max] in sequence;

rho$\leftarrow$f(x, y, z, theta, phi), //x, y, z, theta, and phi are substituted into the planar equation to calculate rho;

hough[phi, theta, rho]$\leftarrow$val+hough[phi, theta, rho], //hough[phi, theta, rho] is assigned with a sum of the val and the hough[phi, theta, rho];

return hough, //the feature of the sample image in the Hough space is returned;

end function.

The embodiment of this application can obtain the feature of the sample image in the Hough space in the implementation A1.

The implementation A2 is the backward propagation algorithm of the 3D DHT network.

Input: hough, //the feature$R^{\varphi \times \theta \times \rho}$ of the sample image in the Hough space;

phi, //a value range thereof is [phi_min, phi_max], and a sampling number is n_phi;

theta, //a value range thereof is [theta_min, theta_max], and a sampling number is n_theta;

rho, //a value range thereof is [rho_min, rho_max], and a sampling number is n_rho;

f //planar equation;

Output: volume. //a feature $R^{H \times W \times D}$ of the sample image in the image space;

An implementation algorithm is as follows:

function dht3d_backward (volume, hough_range, hough_size)//a backward propagation algorithm function of the 3D DHT network. The function includes three inputs: volume, hough_range, and hough_size; hough_range includes value ranges of phi, theta, and rho; hough_size includes sampling numbers of phi, theta, and rho;

volume$\leftarrow 0^{H \times W \times D}$,//a null array with the size of H×W×D is created as a feature volume of the sample image in the image space;

for (h, w, d) in mesh_grid (volume_size), //a pixel used for traversing the volume is created, and coordinates of the pixel is (h, w, d);

accum$\leftarrow$0, //a pixel value accum of the pixel is acquired, and the value is 0;

for phi in phi_range, //phi is valued in [phi_min, phi_max] in sequence;

for phi in phi_range, //theta is valued in [theta_min, theta_max] in sequence;

rho$\leftarrow$f(x, y, z, phi, theta), //x, y, z, phi, and theta are substituted into the planar equation to calculate rho;

accum$\leftarrow$accum+hough[phi, heta, rho], //accum is assigned with a sum of accum and hough[phi, theta, rho];

volume[h, w, d] volume[h, w, d]+accum, //the volume[h, w, d] is assigned with a sum of volume[h, w, d] and accum;

return volume, //the feature of the sample image in the image space;

end function.

The embodiment of this application can obtain the feature of the sample image in the image space in the implementation A2.

In the embodiment of this application, when the sample image is a 2D sample image, the image acquisition model mainly detects a line, an ellipse, or the like of the 2D sample image. Taking the line as an example, an expression of the line in a rectangular coordinate system is $Ax+By+C=0$, and this expression may be converted into an expression in a polar coordinate system: $x \cos \theta + y \sin \theta = \rho$. The feature of the sample image in the image space is $R^{H \times W}$, and the feature of the sample image in the Hough space is $R^{\Theta \times P}$. Where, A, B, and C are three parameters; x and y are two variables; $\theta$ and $\rho$ are two parameters; and R is a real number, H is a height, W is a width. Based on the above information, the 2D DHT network realizes the Hough transform.

Algorithms of the 2D DHT network include a forward propagation algorithm of the 2D DHT network and a backward propagation algorithm of the 2D DHT network. The principle of the forward propagation algorithm of the 2D DHT network is similar to the principle of the forward propagation algorithm of the 3D DHT network. For details, refer to the implementation A1. Details are not further described herein. The principle of the backward propagation algorithm of the 2D DHT network is similar to the principle of the backward propagation algorithm of the 3D DHT network. For details, refer to the implementation A2. Details are not further described herein.

In some embodiments, the operation that the electronic device determines a first Hough spatial feature based on the first image spatial feature includes: the electronic device performs rectification on the first image spatial feature to obtain a rectified first image spatial feature; and the electronic device determines the first Hough spatial feature based on the rectified first image spatial feature. Rectification refers to correcting the first image spatial feature.

In the embodiment of this application, the first network model includes a fast DHT network. The fast DHT network includes a rectifier network and a DHT network. The fast DHT network is used for reducing the computing amount and accelerating the computing speed.

Refer to FIG. 6, which is a schematic diagram of a fast DHT network provided by an embodiment of this application. The first image spatial feature is input into the fast DHT network. The first image spatial feature is rectified by the rectifier network to obtain a rectified first image spatial feature. The DHT network performs Hough transform on the rectified first image spatial feature to obtain the first Hough spatial feature.

In some embodiments, a formula of the rectifier network is: $f(x) = \max(0, x)$. Where, x is data of the first image spatial feature, and $f(x)$ is data of the rectified first image spatial feature. Each piece of data of the first image spatial feature is detected through the rectifier network. When the data is less than 0, the data is reset as 0. When the data is greater than or equal to 0, the data is kept unchanged. In this mode, the data 0 of the first image spatial feature is added, so as to improve the sparsity of the first image spatial feature. The data in the first image spatial feature corresponds to the pixel, which is equivalent to adding the pixel with a feature of 0. By setting that the pixel with the feature of 0 in the image space does not participate in voting in the Hough space, and the pixel with the feature of non-0 in the image space participates in voting in the Hough space, the quantity of pixels participating voting is reduced, and the speed of the Hough transform is improved.

Refer to Table 1, which shows the computing time of the fast DHT network and the DHT network tested on a graphics card. In the embodiment of this application, the computing time of the two sample images in the fast DHT network and the DHT network is tested. An image size corresponding to a heat map of a sample image in image space is 400×400, and an image size corresponding to a heat map of the sample image in Hough space is 180×400. The fast DHT network corresponding to the sample image is a fast 2D DHT network. The DHT network corresponding to the sample image is a 2D DHT network. An image size corresponding to a heat map of another sample image in image space is 192×192×160, and an image size corresponding to a heat map of the sample image in Hough space is 180×180×160. The fast DHT network corresponding to the sample image is a fast 3D DHT network. The DHT network corresponding to the sample image is a 3D DHT network.

TABLE 1

|  | 2D DHT | Fast 2D DHT | 3D DHT | Fast 3D DHT |
|---|---|---|---|---|
| Time (Unit: second) | 0.0193 | 0.0084 | 26.0 | 1.3 |

It can be seen from Table 1 that the computing time of the fast 2D DHT network is much shorter than that of the 2D DHT network, and the computing time of the fast 3D DHT network is much shorter than that of the 3D DHT network. Thus, the fast DHT network can reduce the computing amount and accelerate the computing speed.

In a possible implementation, after the electronic device determines a first Hough spatial feature based on the first image spatial feature, the method further includes: the electronic device determines a second image spatial feature based on the first Hough spatial feature and the first image spatial feature, and the second image spatial feature characterizes a feature of the sample image in the image space; the electronic device determines a third predicted image based on the second image spatial feature, and the third predicted image is a heat map of the sample image obtained by the first network model in the image space; the electronic device determines a second Hough spatial feature based on the second image spatial feature, and the second Hough spatial feature characterizes a feature of the sample image in the Hough space; and the electronic device determines a fourth predicted image based on the second Hough spatial feature, and the fourth predicted image is a heat map of the sample image obtained by the first network model in the Hough space. The operation that the electronic device adjusts the first network model based on the label image pair and the predicted image pair to obtain the second network model includes: the electronic device adjusts the first network model based on the label image pair, the predicted image pair, the third predicted image, and the fourth predicted image to obtain the second network model, so as to reduce the difference, obtained according to the second network model, between the predicted image pair and the label image pair, and reduce the difference between an image pair composed of the third predicted image and the fourth predicted image and the label image pair.

In the embodiment of this application, the network model further obtains the third predicted image and the fourth predicted image. The smaller the difference between the image pair composed of the third predicted image and the fourth predicted image and the label image pair, the higher the accuracy of the network model. Therefore, the network model is adjusted with purposes of reducing the difference, obtained according to the network model, between the predicted image pair and the label image pair and reducing the difference between the image pair composed of the third predicted image and the fourth predicted image and the label image pair, so that the adjusted network model is more accurate. The difference between the image pair composed of the third predicted image and the fourth predicted image and the label image pair refers to a difference between the first label image and the third predicted image and a difference between the second label image and the fourth predicted image.

In the embodiment of this application, the second image spatial feature is determined based on the first image spatial feature and the first Hough spatial feature according to the first network model first. Then, in one aspect, upsampling is performed based on the second image spatial feature according to the first network model to obtain the third predicted image. In another aspect, Hough transform is performed based on the second image spatial feature according to the first network model to obtain the second Hough spatial feature. After that, upsampling is performed based on the second Hough spatial feature according to the first network model to obtain the fourth predicted image.

After that, a loss value of the first network model is calculated based on the label image pair, the predicted image pair, the third predicted image, and the fourth predicted image, and a model parameter of the first network model is adjusted based on the loss value of the first network model to obtain the second network model.

In the embodiment of this application, the first predicted image can be obtained based on the first image spatial feature, and the second predicted image can be obtained based on the first Hough spatial feature. After that, the second image spatial feature is determined based on the first image spatial feature and the first Hough spatial feature, and the accuracy of the image spatial feature is improved by performing further processing on a feature, so that the third predicted image obtained by the second image spatial feature is more accurate. Similarly, the accuracy of the second Hough spatial feature determined based on the second image spatial feature is improved, so that the fourth predicted image obtained based on the second Hough spatial feature is more accurate. The first network model is adjusted by using the first predicted image, the second predicted image, the third predicted image, and the fourth predicted image, so that the model learns more information, and the convergence speed of the model is accelerated.

In some embodiments, the operation that the electronic device determines the second image spatial feature based on the first Hough spatial feature and the first image spatial feature includes: the electronic device determines a third image spatial feature based on the first Hough spatial feature, and the third image spatial feature characterizes a feature of the sample image in the image space; the electronic device fuses the first image spatial feature and the third image spatial feature to obtain a first fused feature; and the electronic device determines a second image spatial feature based on the first fused feature.

In the embodiment of this application, the first network model includes an IDHT network. The IDHT network performs inverse Hough transform on the first Hough spatial feature to obtain a third image spatial feature. The first Hough spatial feature is obtained based on the first image spatial feature, that is, in the embodiment of this application, the first image spatial feature is processed first to obtain the first Hough spatial feature, and then the first Hough spatial feature is processed to obtain the third image spatial feature. This process will lead to a feature loss. The third image spatial feature and the first image spatial feature are fused to reduce the influence caused by the feature loss to obtain a first fused feature. After that, the second image spatial feature is determined based on the first fused feature.

Figure 7:
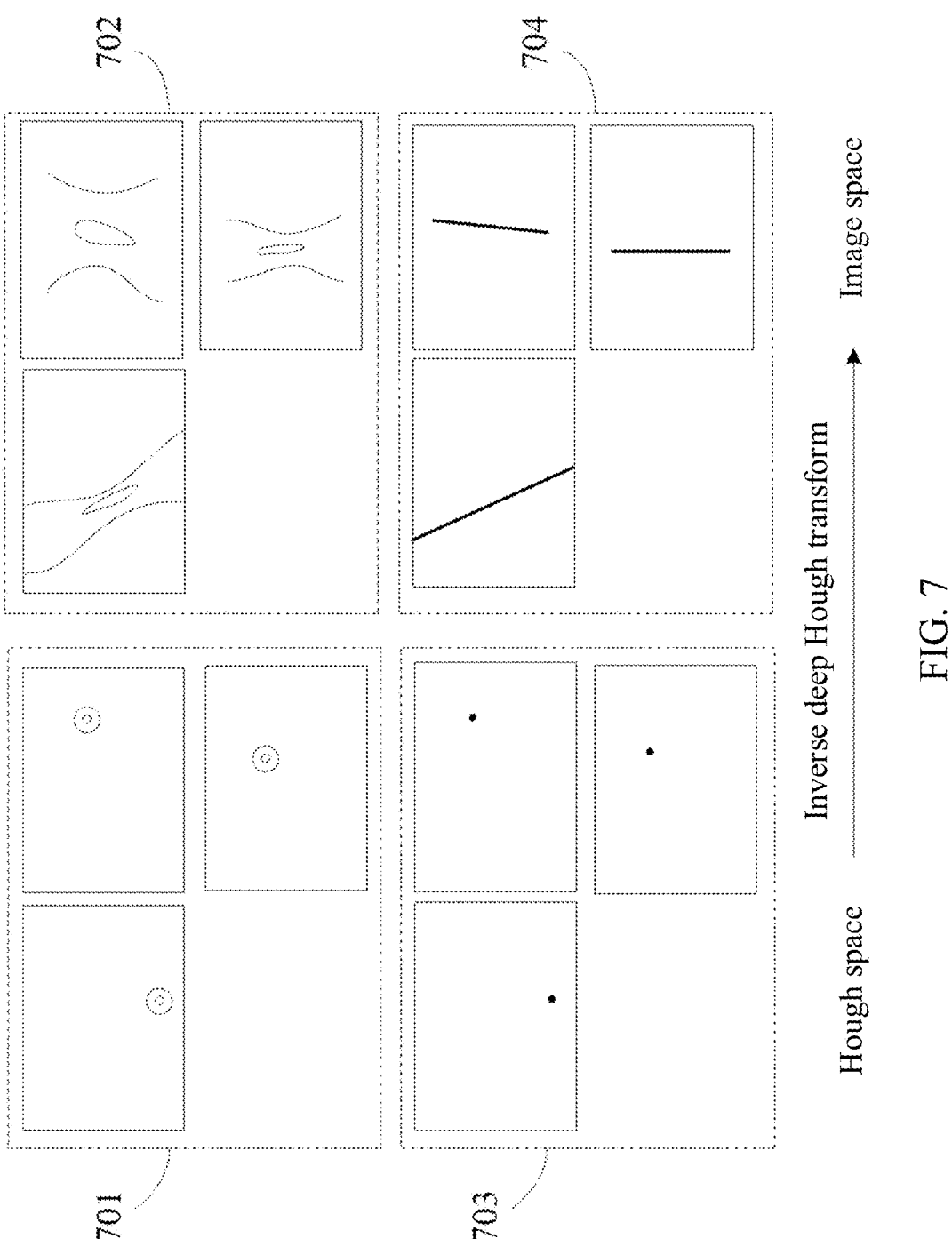
FIG. 7 is one schematic diagram of an inverse deep Hough transform (IDHT) provided by an embodiment of this application.
Figure 23:
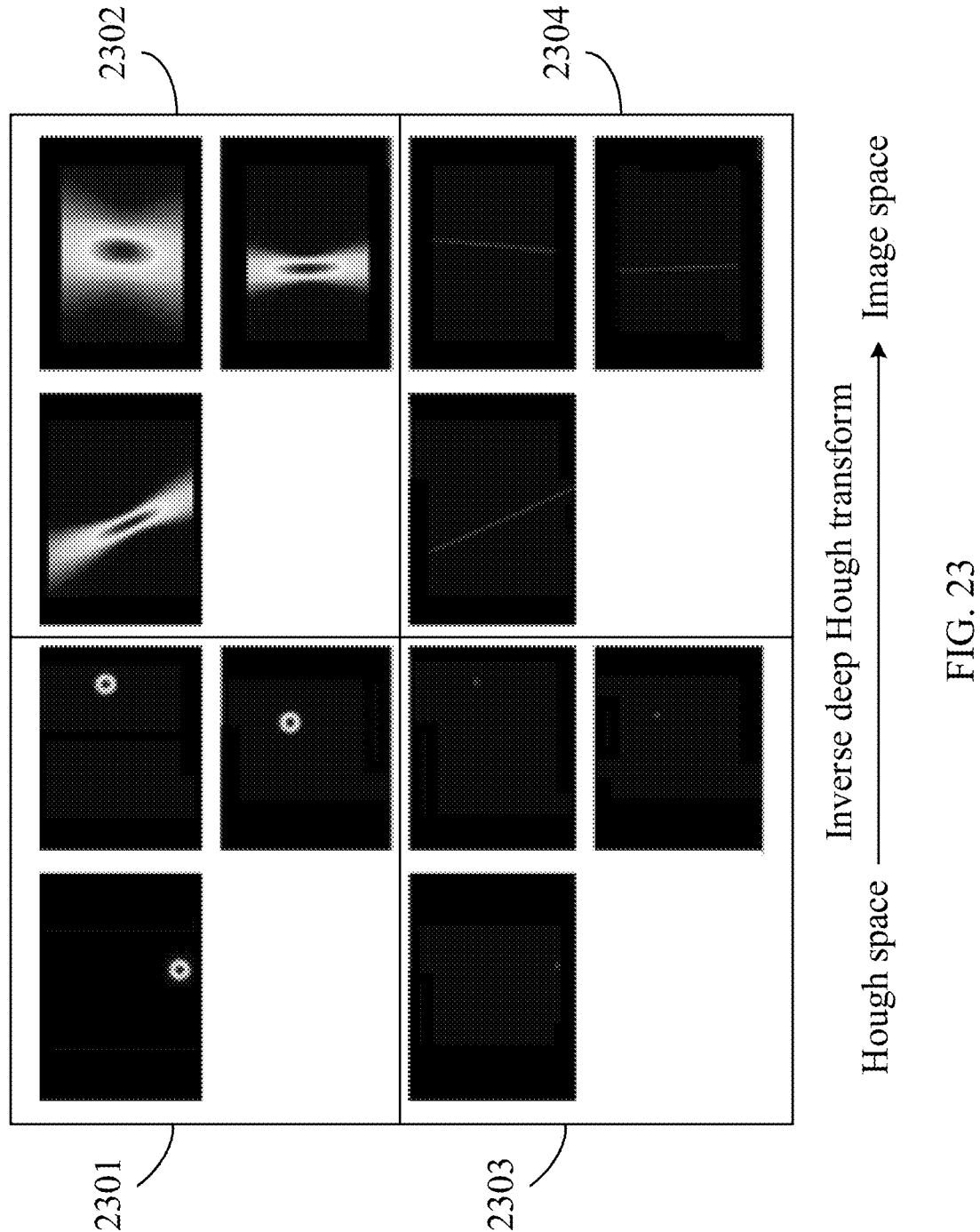
FIG. 23 is another schematic diagram of an IDHT provided by an embodiment of this application.

Refer to FIG. 7 or FIG. 23, which is one schematic diagram of an IDHT provided by an embodiment of this application. The inverse deep Hough transform is used for transforming an image from the Hough space to the image space. The three images indicated by number 701 are heat maps of a sample image in the Hough space in different perspectives. A rendering corresponding to number 701 is indicated by number 2301. The three images indicated by number 702 are heat maps of the sample image in the image space in different perspectives. A rendering corresponding to number 702 is indicated by number 2302. Hough spatial features corresponding to the three images indicated by number 701 are transformed into the image spatial features corresponding to the three images indicated by number 702 through the IDHT network. The three images indicated by number 703 are heat maps of a sample image in the Hough space in different perspectives. A rendering corresponding to number 703 is indicated by number 2303. The three images indicated by number 704 are heat maps of the sample image in the image space in different perspectives. A rendering corresponding to number 704 is indicated by number 2304. Hough spatial features corresponding to the three images indicated by number 703 are transformed into the image spatial features corresponding to the three images indicated by number 704 through the IDHT network.

The inverse Hough transform of the IDHT network is an inverse process of the Hough transform of the DHT network. The IDHT network includes a 2D IDHT network and a 3D IDHT. The 2D IDHT network includes a forward propagation algorithm of the 2D IDHT network and a backward propagation algorithm of the 2D IDHT network, and the 3D IDHT network includes a forward propagation algorithm of the 3D IDHT network and a backward propagation algorithm of the 3D IDHT network. The principle of the forward propagation algorithm of the 2D IDHT network and the principle of the forward propagation algorithm of the 3D IDHT network are the same as the principle of the backward propagation algorithm of the 3D IDHT network. For details, refer to the implementation A2. Details are not further described herein. The principle of the backward propagation algorithm of the 2D IDHT network and the principle of the backward propagation algorithm of the 3D IDHT network are the same as the principle of the forward propagation algorithm of the 3D DHT network. For details, refer to the implementation A1. Details are not further described herein.

In a possible implementation, the operation that the electronic device adjusts the first network model based on the label image pair, the predicted image pair, the third predicted image, and the fourth predicted image to obtain the second network model includes: the electronic device obtains a first loss value according to the label image pair and the predicted image pair; the electronic device obtains a second loss value according to the label image pair, the third predicted image, and the fourth predicted image; the electronic device obtains a loss value of the first network model based on the first loss value and the second loss value; and the electronic device adjusts the first network model based on the loss value of the first network model to obtain the second network model.

The first loss value represents a difference between the predicted image and the label image pair, and the second loss value represents a difference between the image pair composed of the third predicted image and the fourth predicted image and the label image pair.

In the embodiment of this application, the label image pair includes a first label image and the second label image. The predicted image pair includes a first predicted image and a second predicted image. The electronic device calculates the first loss value based on the first label image, the second label image, the first predicted image, and the second predicted image. The second loss value is calculated based on the first label image, the second label image, the third predicted image, and the fourth predicted image. The loss value of the first network model is calculated based on the first loss value and the second loss value. An image acquisition model is trained through the label image pair, the predicted image pair, the third predicted image, and the fourth predicted image. The learning of the model is supervised in both the image space and the Hough space, and the accuracy of model is improved. The first loss value is calculated based on the first predicted image and the second predicted image. The second loss value is calculated based on the third predicted image and the fourth predicted image. The first network model is adjusted through the first loss value and the second loss value, which is equivalent to supervising the learning of the model based on the predicted images in two stages, so that the model learns more information, can accelerate the convergence speed of the model, and facilitates completing model training quickly, thereby improving the efficiency of image detection. The loss value of the first network model is calculated according to Formula (1) as follows.

$$L_{s1} = \frac{1}{N}\sum(P_{out1} - P_{gt})^2 + \frac{1}{M}\sum(H_{out1} - H_{gt})^2 \quad \text{Formula (1)}$$

$$L_{s2} = \frac{1}{N}\sum(P_{out2} - P_{gt})^2 + \frac{1}{M}\sum(H_{out2} - H_{gt})^2$$

$$L_{total} = L_{s1} + L_{s2}.$$

Where, $L_{total}$ is a loss value of the first network model, $L_{s1}$ is the first loss value, $L_{s2}$ is the second loss value, N is a number of pixels of the sample image in the heat map of the image space, $P_{out1}$ is the first predicted image, $P_{gt}$ is the first label image, M is a number of pixels of the sample image in the heat map of the Hough space, $H_{out1}$ is the second predicted image, $H_{gt}$ is the second label image, $P_{out2}$ is the third predicted image, and $H_{out2}$ is the fourth predicted image.

In some embodiments, the electronic device acquires the heat map of the sample image in the image space and the heat map of the sample image in the Hough space. Gaussian processing is performed on the heat map of the sample image in the image space to obtain the first label image. Gaussian processing is performed on the heat map of the sample image in the Hough space to obtain the second label image.

Taking the sample image being a brain image as an example, the heat map of the brain image in the image space (the image may be a gold standard image of the brain image) is a line. Gaussian processing is performed through Gaussian kernel convolution to change the line into a strip (that is, a line pencil), and a pixel value is normalized to [0, 1] to obtain the first label image. Parameters of the Gaussian kernel convolution are not limited. Exemplarily, the parameters of the Gaussian kernel convolution are (5, 5, 5). The heat map of the brain image in the Hough space (the image is also a gold standard image of the brain image) includes one point. The position of the point is (phi, theta, rho). Through Gaussian processing, the point is transformed into a Gaussian sphere. A size of the Gaussian sphere is not limited. Exemplarily, the size of the Gaussian sphere is (5, 5, 5).

The loss function shown in Formula (1) is a mean square loss function. In an application, other functions other than the mean square loss function may be selected as a loss function of the first network model.

After obtaining the loss value of the first network model, the electronic device adjusts a model parameter of the first network model based on the loss value of the first network model to obtain the second network model. The electronic device determines the second network model as the image acquisition model in response to the second network model satisfying a training termination condition.

Figure 8:
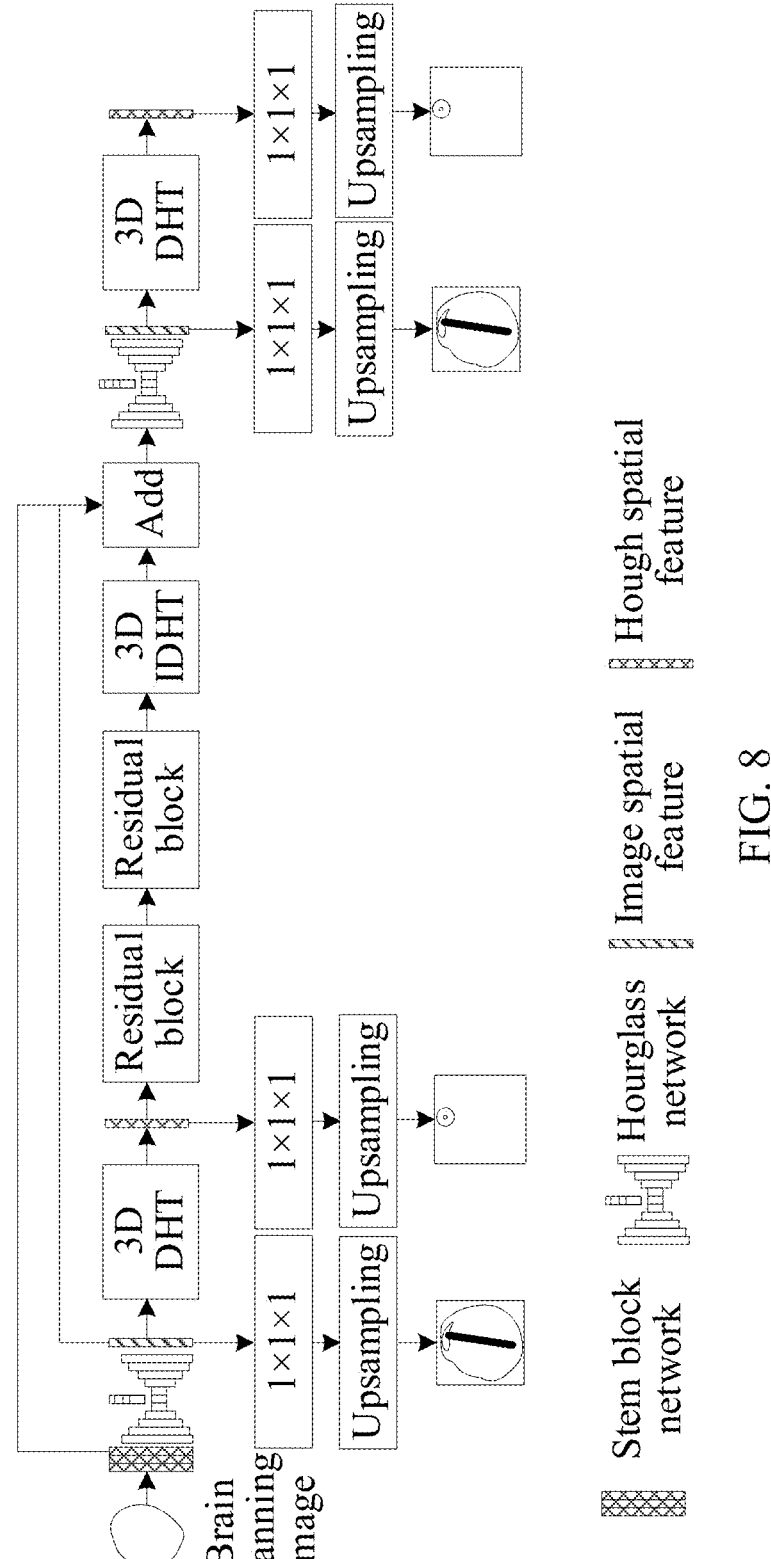
FIG. 8 is one schematic diagram of a first network model provided by an embodiment of this application.

The embodiment of this application provides a first network model. As shown in FIG. 8, which is a schematic diagram of a first network model provided by the embodiment of this application. In the embodiment of this application, the sample image is a brain scanning image. The first label image is a heat map of the brain scanning image in image space. The second label image is a heat map of the brain scanning image in Hough space.

The first network model includes a stem block network, an hourglass network, and a 3D DHT network. The brain scanning image is input into the first network model. The stem block network extracts an initial feature of the brain scanning image. The stem block network may include three convolutional layers. Then, a first image spatial feature (that is, the first image spatial feature) is obtained after the initial feature is processed through the hourglass network. The hourglass network is a convolutional neural network used for key point detection.

In one aspect, the heat map (that is, the first predicted image) of the brain scanning image in the image space is obtained after 1×1×1 convolution and upsampling are performed on the first image spatial feature. In another aspect, a first Hough spatial feature (that is, the first Hough spatial feature) is obtained after the Hough transform is performed on the first image spatial feature through the 3D DHT network. The heat map (that is, the second predicted image) of the brain scanning image in the Hough space is obtained after 1×1×1 convolution and upsampling are performed on the first Hough spatial feature.

After that, the electronic device obtains the loss value of the first network model based on the first label image, the second label image, the first predicted image, and the second predicted image, and trains to obtain an image acquisition model based on the loss value of the first network model. The image acquisition model includes a 3D DHT network, so parameters of the 3D DHT network will be adjusted during training the first network model.

In some embodiments, the first network model further includes a residual block network, a 3D IDHT network, and the like. The first Hough spatial feature is subjected to further Hough spatial feature extraction by two residual block networks first, and then is subjected to inverse Hough transform through the 3D IDHT network to obtain a third image spatial feature.

After that, the electronic device performs addition processing (that is, fusion processing) on the third image spatial feature, the first image spatial feature, and the initial feature to obtain a first fused feature. A second image spatial feature (that is, the second image spatial feature) is obtained after feature processing is performed on the first fused feature through the hourglass network. In one aspect, the heat map (that is, the third predicted image) of the brain scanning image in the image space is obtained after 1×1×1 convolution and upsampling are performed on the second image spatial feature. In another aspect, a second Hough spatial feature (that is, the second Hough spatial feature) is obtained after the Hough transform is performed on the second image spatial feature through the 3D DHT network. The heat map (that is, the fourth predicted image) of the brain scanning image in the Hough space is obtained after 1×1×1 convolution and upsampling are performed on the second Hough spatial feature.

After that, the electronic device obtains the loss value of the first network model according to Formula (1) based on the first label image, the second label image, the first predicted image, the second predicted image, the third predicted image, and the fourth predicted image. The image acquisition model is obtained by training based on the loss value of the first network model. The image acquisition model includes a 3D DHT network and a 3D IDHT network, so parameters of the 3D DHT network and the 3D IDHT network will be adjusted during the first network model.

In a possible implementation, the first image spatial feature includes at least two sub-image spatial features. The operation that the electronic device determines the first predicted image based on the first image spatial feature includes: the electronic device determines the first predicted image based on the at least two sub-image spatial features.

In the embodiment of this application, the first image spatial feature includes at least two sub-image spatial features, the at least two sub-image spatial features are pyramid level features, that is, each sub-image spatial feature increases gradually or decreases gradually, and the first network model can determine the first predicted image based on the at least two sub-image spatial features.

In some embodiments, the operation that the electronic device determines a first Hough spatial feature based on the first image spatial feature includes: for a sub-image spatial feature of the at least two sub-image spatial features, the electronic device determines a sub-Hough spatial feature corresponding to the sub-image spatial feature, and the first Hough spatial feature includes the sub-Hough spatial feature corresponding to the sub-image spatial feature. The electronic device determines the second predicted image based on the first Hough spatial feature includes: the electronic device determines the second predicted image based on the sub-Hough spatial feature corresponding to each sub-image spatial feature.

For any sub-image spatial feature of the at least two sub-image spatial features, the electronic device performs Hough transform on the sub-image spatial feature to obtain a sub-Hough spatial feature corresponding to the sub-image spatial space. In this mode, the sub-Hough spatial feature corresponding to each sub-image spatial feature can be obtained, that is, the first Hough spatial feature is obtained. The sub-Hough spatial feature corresponding to each sub-image spatial feature included in the first Hough spatial feature is also a pyramid level feature. The first network model can determine the second predicted image based on the sub-Hough spatial feature corresponding to each sub-image spatial feature.

In some embodiments, the first image spatial feature includes at least two sub-image spatial features. The first Hough spatial feature includes the sub-Hough spatial feature corresponding to each sub-image spatial feature. The operation that the electronic device determines a first Hough spatial feature based on the first image spatial feature includes: for a sub-image spatial feature other than the first sub-image spatial feature of the at least two sub-image spatial features, the electronic device determines a second fused feature corresponding to the sub-image spatial feature based on the sub-image spatial feature and a previous sub-image spatial feature of the sub-image spatial feature; and the electronic device determines a sub-Hough spatial feature corresponding to the sub-image spatial feature based on the second fused feature corresponding to the sub-image spatial feature and the previous sub-image spatial feature of the sub-image spatial feature.

In the embodiment of this application, for the first sub-image spatial feature, the electronic device determines the second fused feature corresponding to the first sub-image spatial feature based on the first sub-image spatial feature.

For any sub-image spatial feature other than the first sub-image spatial feature of the at least two sub-image spatial features, the electronic device determines a second fused feature corresponding to the sub-image spatial feature based on the sub-image spatial feature and a previous sub-image spatial feature of the sub-image spatial feature. For example, for the third sub-image spatial feature, the electronic device determines a second fused feature corresponding to the third sub-image spatial feature based on the third sub-image spatial feature and the second sub-image spatial feature.

In some embodiments, the operation that the electronic device determines a second fused feature corresponding to the sub-image spatial feature based on the sub-image spatial feature and the previous sub-image spatial feature of the sub-image spatial feature includes: the electronic device determines the second fused feature corresponding to the previous sub-image spatial feature based on the previous sub-image spatial feature of the sub-image spatial feature; the fourth image spatial feature is determined based on the second fused feature corresponding to the previous sub-image spatial feature, and the fourth image spatial feature characterizes a feature of the sample image in the image space; the electronic device determines a third Hough spatial feature based on the fourth image spatial feature, and the third Hough spatial feature characterizes a feature of the sample image in the Hough space; and the electronic device determines the second fused feature corresponding to the sub-image spatial feature based on the sub-image spatial feature, the third Hough spatial feature, and the second fused feature corresponding to the previous sub-image spatial feature.

For any sub-image spatial feature other than the first sub-image spatial feature of the at least two sub-image features, the electronic device determines a second fused feature corresponding to the previous sub-image spatial feature of the sub-image spatial feature. When the previous sub-image spatial feature is the first sub-image spatial feature, the second fused feature corresponding to the first sub-image spatial feature is determined based on the first sub-image spatial feature. In some embodiments, convolution is performed on the first sub-image spatial feature to obtain the second fused feature corresponding to the first sub-image spatial feature. When the previous sub-image spatial feature is a sub-image spatial feature other than the first sub-image spatial feature, a method for determining the second fused feature corresponding to the previous sub-image spatial feature is the same as the method for determining the second fused feature corresponding to the sub-image spatial feature in the embodiment of this application. Details are described below.

For a sub-image spatial feature other than the first sub-image spatial feature of the at least two sub-image spatial features, after determining the second fused feature corresponding to the previous sub-image spatial feature of the sub-image spatial feature, the electronic device performs convolution on the second fused feature corresponding to the previous sub-image spatial feature to obtain the fourth image spatial feature. After that, the electronic device performs Hough transform on the fourth image spatial feature to obtain a third Hough spatial feature, and then obtains the second fused feature corresponding to the sub-image spatial feature based on the sub-image spatial feature, the third Hough spatial feature, and the second fused feature corresponding to the previous sub-image spatial feature.

In some embodiments, the electronic device performs inverse Hough transform on the third Hough spatial feature first to obtain a fifth image spatial feature. The fifth image spatial feature characterizes the feature of the sample image in the image space. Then, the fifth image spatial feature is normalized to obtain a normalized fifth image spatial feature. After that, the normalized fifth image spatial feature is multiplied by the sub-image spatial feature to obtain a product result. Convolution is performed on the second fused feature corresponding to the previous sub-image spatial feature to obtain the fourth image spatial feature, and a product result is added to the fourth image spatial feature to obtain the second fused feature corresponding to the sub-image spatial feature. Exemplarily, normalization may be implemented by using activation functions, such as Sigmoid.

Figure 9:
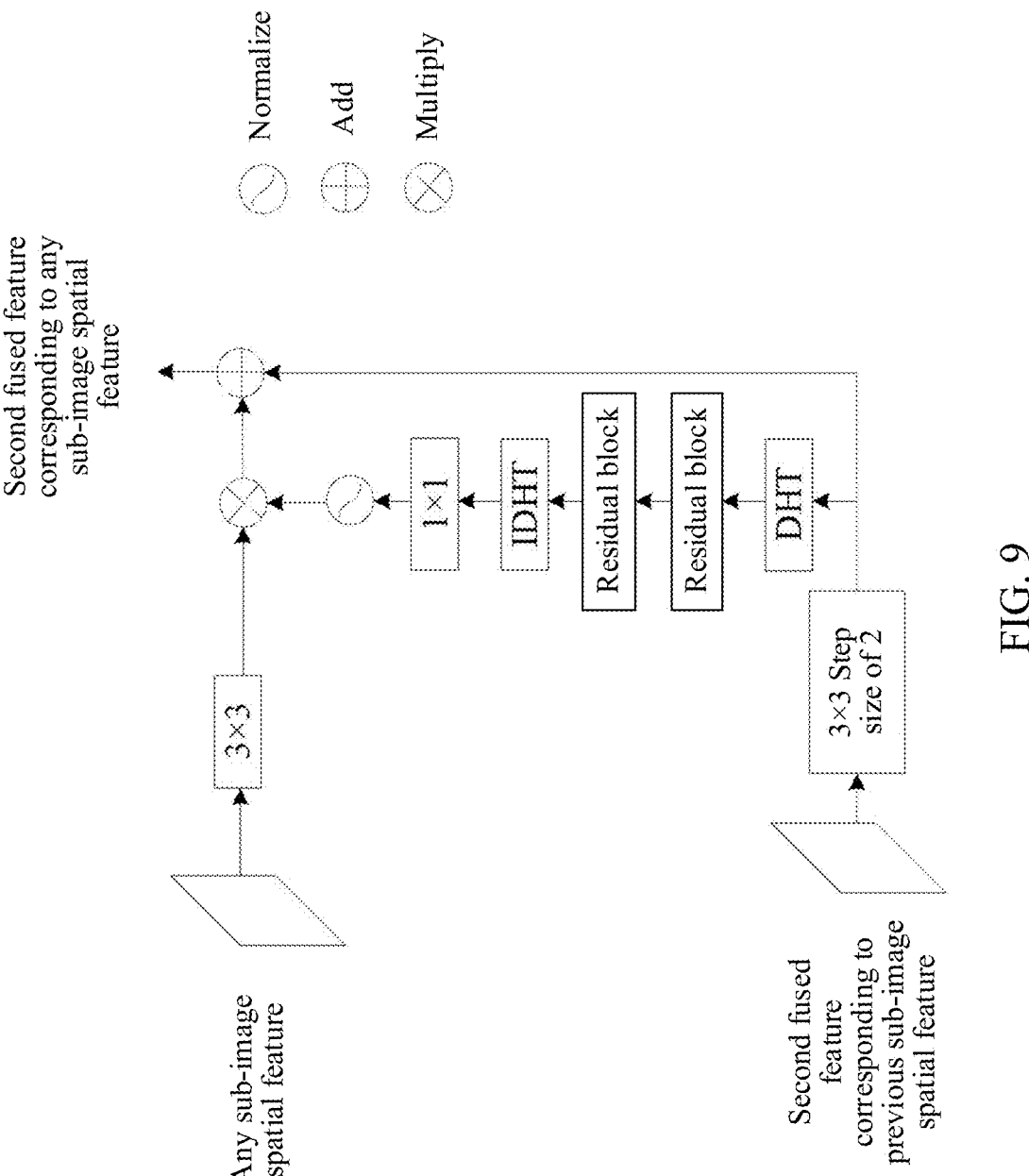
FIG. 9 is a flowchart of a second fused feature determination method provided by an embodiment of this application.

Refer to FIG. 9, which is a flowchart of a second fused feature determination method provided by an embodiment of this application. Since the second fused feature corresponding to the previous sub-image spatial feature is greater than the sub-image spatial feature, 3×3 convolution with a step size of 2 is performed on the second fused feature corresponding to the previous sub-image spatial feature, so as to align the second fused feature corresponding to the previous sub-image spatial feature and any sub-image spatial feature in size to obtain a fourth image spatial feature. Hough transform is performed on the fourth image spatial feature based on the DHT network to obtain a third Hough spatial feature. Then, feature extraction is performed on the third Hough spatial feature based on two residual block networks to extract a feature of the Hough space. The third Hough spatial feature after feature extraction is subjected to inverse Hough transform based on the IDHT to obtain a fifth image spatial feature. Then, 1×1 convolution is performed on the fifth image spatial feature, and the fifth image spatial feature after the convolution is normalized to obtain the normalized fifth image spatial feature.

After that, the electronic device performs 3×3 convolution on any sub-image spatial feature to align the second fused feature corresponding to the previous sub-image spatial feature and any sub-image spatial feature in size. The any sub-image spatial feature after convolution is multiplied with the normalized fifth image spatial feature to obtain a product result. The product result is added to the fourth image spatial feature to obtain the second fused feature corresponding to the sub-image spatial feature.

After that, the electronic device determines a sub-Hough spatial feature corresponding to the sub-image spatial feature based on the second fused feature corresponding to the sub-image spatial feature and the previous sub-image spatial feature of the sub-image spatial feature.

In the embodiment of this application a process of obtaining the normalized fifth image spatial feature based on the fourth image spatial feature may be expressed by using Formula (2) as follows.

$$y = \sigma(h^{-1}(f(h(x)))) \qquad \text{Formula (2)}$$

Where, y is the normalized fifth image spatial feature, a is a function symbol for normalization, $h^{-1}$ is a function symbol for inverse Hough transform, f is a function symbol for performing feature extraction by two residual block networks, h is a function symbol for Hough transform, and x is a fourth image spatial feature.

The network structure shown in FIG. 9 may be used as a pluggable network structure in the first network model. That is, the first network model may include the network structure shown in FIG. 9, or may not include the network structure shown in FIG. 9. The network structure shown in FIG. 9 is an attention mechanism-based network structure. The second fused feature corresponding to the previous sub-image spatial feature is a high level feature, and the sub-image spatial feature is a low level feature. The fifth image spatial feature is obtained by performing Hough transform and inverse Hough transform on the high level feature, so that the network structure pays more attention to an image spatial feature, and the accuracy of the image spatial feature is improved. Therefore, the accuracy of an image acquisition model is improved.

In some embodiments, the operation that the electronic device determines a sub-Hough spatial feature corresponding to the sub-image spatial feature based on the second fused feature corresponding to the sub-image spatial feature and the previous sub-image spatial feature of the sub-image spatial feature includes: the electronic device determines the sub-Hough spatial feature corresponding to the previous sub-image spatial feature based on the previous sub-image spatial feature of the sub-image spatial feature; the electronic device determines the sub-Hough spatial feature corresponding to the second fused feature based on the second fused feature corresponding to the sub-image spatial feature; and the electronic device determines a sub-Hough spatial feature corresponding to the sub-image spatial feature based on the sub-Hough spatial feature corresponding to the second fused feature and the sub-Hough spatial feature corresponding to the previous sub-image spatial feature.

For a sub-image spatial feature other than the first sub-image spatial feature of the at least two sub-image spatial features, the electronic device determines a sub-Hough space corresponding to the previous sub-image spatial feature of any sub-image spatial feature. When the previous sub-image spatial feature is the first sub-image spatial feature, Hough transform is performed on the second fused feature corresponding to the first sub-image spatial feature to obtain the sub-Hough spatial feature corresponding to the first sub-image spatial feature. When the previous sub-image spatial feature is any sub-image spatial feature other than the first sub-image spatial feature, a method for determining the sub-Hough spatial feature corresponding to the previous sub-image spatial feature is the same as the method for determining the sub-Hough spatial feature corresponding to any sub-image spatial feature. Details are described below.

For a sub-image spatial feature other than the first sub-image spatial feature of the at least two sub-image spatial features, after determining the sub-Hough spatial feature corresponding to the previous sub-image spatial feature of any sub-image spatial feature, the electronic device performs Hough transform on the second fused feature corresponding to any sub-image spatial feature first to obtain a sub-Hough spatial feature corresponding to the second fused feature, and then, fuses the sub-Hough spatial feature corresponding to the second fused feature and the sub-Hough spatial feature corresponding to the previous sub-image spatial feature to obtain the sub-Hough spatial feature corresponding to any sub-image spatial feature.

Based on the above mode, the sub-Hough spatial feature corresponding to each sub-image spatial feature can be obtained. The first image spatial feature of the embodiment of this application includes at least two sub-image spatial features. The first predicted image can be determined based on the at least two sub-image spatial features. The first Hough spatial feature includes the sub-Hough spatial feature corresponding to each sub-image spatial feature. The second predicted image can be determined based on the sub-Hough spatial feature corresponding to each sub-image spatial feature. After that, the first network model is adjusted based on the label image pair, the first predicted image, and the second predicted image to obtain the second network model.

In some embodiments, the operation that the electronic device adjusts the first network model based on the label image pair and the predicted image pair to obtain the second network model includes: the electronic device obtains a loss value of the first network model according to the label image pair and the predicted image pair; and the first network model is adjusted based on the loss value of the first network model to obtain the second network model. The loss value of the first network model represents a difference between the predicted image pair and the label image pair.

In the embodiment of this application, the label image pair includes a first label image and the second label image. The predicted image pair includes a first predicted image and a second predicted image. The loss value of the first network model is calculated based on the first label image, the second label image, the first predicted image, and the second predicted image, and an image acquisition model is trained through the label image pair and the predicted image pair, the learning of the model is supervised in both the image space and the Hough space, the convergence speed of the model can be accelerated, and the image detection efficiency is improved.

The loss value of the first network model is calculated according to Formula (3) as follows.

$$L_{spatial} = \frac{1}{N}(l - \hat{l})^2 \qquad \text{Formula (3)}$$

$$L_{hough} = \frac{1}{M}(h - \hat{h})^2$$

$$L_{total} = L_{spatial} + L_{hough}$$

Where, $L_{spatial}$ is a loss value of the image space, $L_{hough}$ is a loss value of the Hough space, $L_{total}$ is a loss value of the first network model, N is a number of pixels of the sample image in the image space, l is the first predicted image, $\hat{l}$ is the first label image, M is a number of pixels of the sample image in the Hough space, h is the second predicted image, and $\hat{h}$ is the second label image.

After obtaining the loss value of the first network model, the electronic device adjusts a model parameter of the first network model based on the loss value of the first network model to obtain the second network model, and determines the second network model as the image acquisition model in response to the second network model satisfying a training termination condition.

Figure 10:
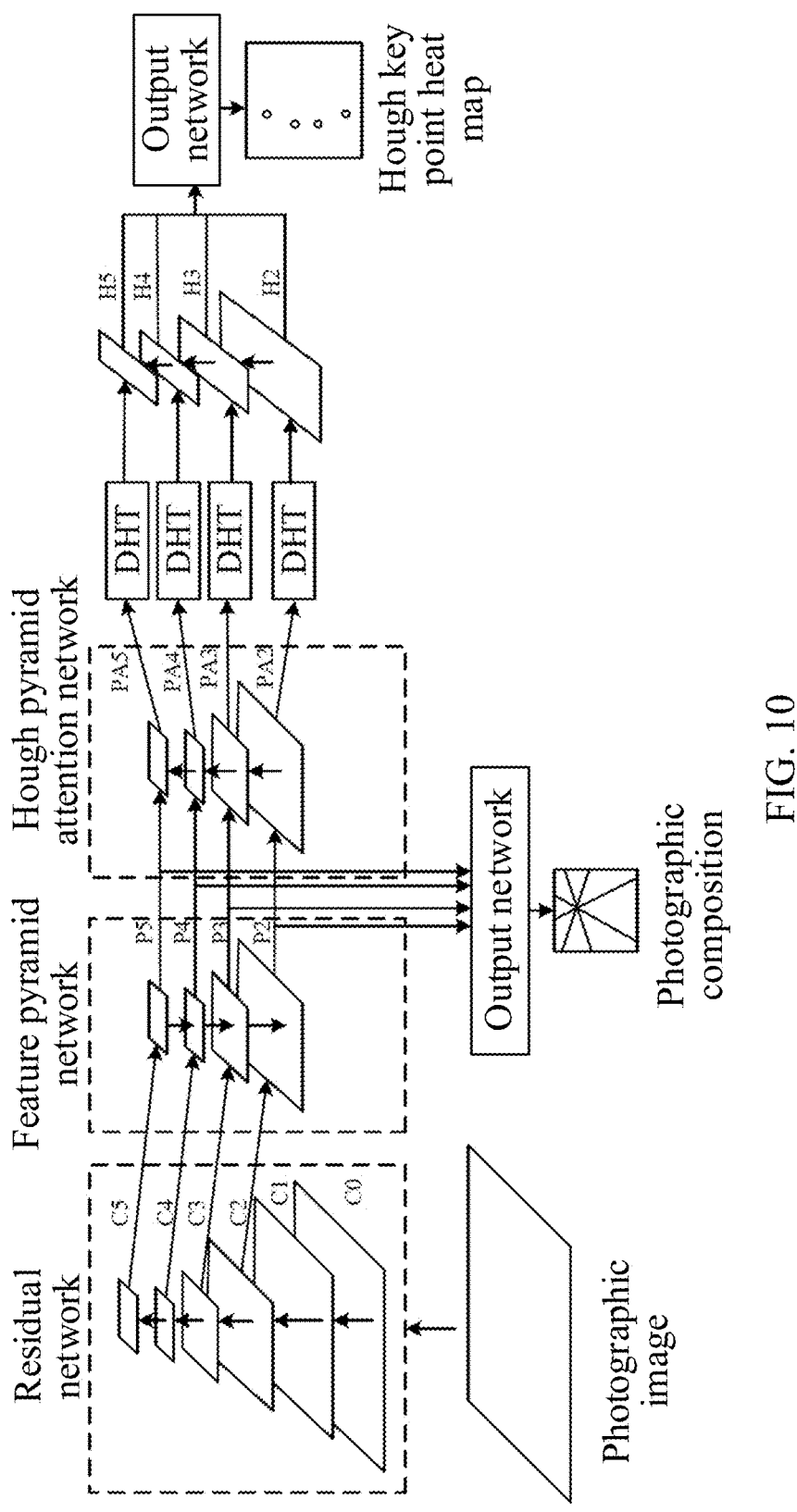
FIG. 10 is another schematic diagram of a first network model provided by an embodiment of this application.

The embodiment of this application provides another first network model. As shown in FIG. 10, which is another schematic diagram of a first network model provided by the embodiment of this application. In the embodiment of this application, the sample image is a photographic image, and the first label image is a heat map of the photographic image in image space (abbreviated as a photographic composition). The second label image is a heat map of the photographic image in Hough space (abbreviated as a Hough key point heat map).

The first network model includes a residual network (such as a Resnet 50 network), a feature pyramid network (FPN), a Hough pyramid attention network (HPAN), a DHT network, and an output network. The photographic image is input into the residual network, the residual network extracts an initial feature of the photographic image. The initial feature includes at least two sub-initial features. The at least two sub-initial features are pyramid level features.

Six sub-initial features are taken as an example for description. The photographic image is input into the residual network, and an information flow of the residual network is an up stream information flow. The residual network extracts a sub-initial feature C0 first, then obtains a sub-initial feature C1 based on the sub-initial feature C0, then obtains a sub-initial feature C2 based on the sub-initial feature C1, and so on, until the sub-initial feature C5 is obtained. The sub-initial features C2 to C5 are input into the FPN. The PFN determines the first image spatial feature of the photographic image. The first image spatial feature includes at least two sub-image spatial features. The information flow of the FPN is a down stream information flow.

Four sub-image spatial features are taken as an example for description. The FPN determines a sub-image spatial feature P5 based on the sub-initial feature C5. The FPN determines a sub-image spatial feature P4 based on the sub-initial feature C4 and the sub-image spatial feature P5. The FPN determines a sub-image spatial feature P3 based on the sub-initial feature C3 and the sub-image spatial feature P4. The FPN determines a sub-image spatial feature P2 based on the sub-initial feature C2 and the sub-image spatial feature P3. In one aspect, an output network determines and outputs a photographic composition based on the sub-image spatial features P2 to P5. In another aspect, the HPAN determines a second fused feature corresponding to each sub-image spatial feature, and the information flow of the HPAN is an up stream information flow.

The HPAN determines a second fused feature PA2 corresponding to the sub-image spatial feature P2 based on the sub-image spatial feature P2. The HPAN determines a second fused feature PA3 corresponding to the sub-image spatial feature P3 based on the sub-image spatial feature P3 and the second fused feature PA2. The HPAN determines a second fused feature PA4 corresponding to the sub-image spatial feature P4 based on the sub-image spatial feature P4 and the second fused feature PA3. The HPAN determines a second fused feature PA5 corresponding to the sub-image spatial feature P5 based on the sub-image spatial feature P5 and the second fused feature PA4.

The HPAN determines the second fused feature in a mode shown in FIG. 9, which is described by taking an example in which the HPAN determines the second fused feature PA3 based on the sub-image spatial feature P3 and the second fused feature PA2. The HPAN performs 3×3 convolution on the second fused feature PA2 first to obtain a fourth image spatial feature, and performs Hough transform on the fourth image spatial feature based on the DHT network to obtain a third Hough spatial feature. Then, feature extraction is performed on the third Hough spatial feature based on two residual block networks, and then inverse Hough transform is performed on the third Hough spatial feature after the feature extraction based on the IDHT network to obtain a fifth image spatial feature. Then, 1×1 convolution is performed on the fifth image spatial feature, and the fifth image spatial feature after the convolution is normalized to obtain the normalized fifth image spatial feature. After that, 3×3 convolution is performed on the sub-image spatial feature P3, and the sub-image spatial feature P3 after the convolution is multiplied with the normalized fifth image spatial feature to obtain a product result. The product result is added to the fourth image spatial feature to obtain the second fused feature PA3.

After the HPAN determines the second fused feature corresponding to each sub-image spatial feature, the DHT determines a sub-Hough spatial feature corresponding to each sub-image spatial feature, and the information of the DHT network is an up stream information flow.

The DHT network performs Hough transform on the second fused feature PA2 to obtain a sub-Hough spatial feature H2 corresponding to the sub-image spatial feature P2. The DHT network performs Hough transform on the second fused feature PA3 to obtain a sub-Hough spatial feature corresponding to the second fused feature PA3, and determines a sub-Hough spatial feature H3 corresponding to the sub-image spatial feature P3 based on the sub-Hough spatial feature corresponding to the second fused feature PA3 and the sub-Hough spatial feature H2. The DHT network performs Hough transform on the second fused feature PA4 to obtain a sub-Hough spatial feature corresponding to the second fused feature PA4, and determines a sub-Hough spatial feature H4 corresponding to the sub-image spatial feature P4 based on the sub-Hough spatial feature corresponding to the second fused feature PA4 and the sub-Hough spatial feature H3. The DHT network performs Hough transform on the second fused feature PA5 to obtain a sub-Hough spatial feature corresponding to the second fused feature PA5, and determines a sub-Hough spatial feature H5 corresponding to the sub-image spatial feature P5 based on the sub-Hough spatial feature corresponding to the second fused feature PA5 and the sub-Hough spatial feature H4. After that, the output network determines and outputs a Hough key point heat map based on the sub-Hough spatial features H2 to H5.

When the sample image is a 3D sample image, the image acquisition model mainly detects a certain plane of the 3D sample image. Therefore, the heat map of the sample image in the image space may be used as a plane attention image of the sample image. When the sample image is a 2D sample image, the image acquisition model mainly detects a line, an ellipse, or the like of the 2D sample image. Therefore, the heat map of the sample image in the image space may be used as a line attention image of the sample image. Since the DHT network and the IDHT can realize the transform of the sample image in the image space and the sample image in the Hough space, the image acquisition model can conveniently and quickly extract geometric features, such as lines and planes, and improve the accuracy of image detection.

Figure 11:
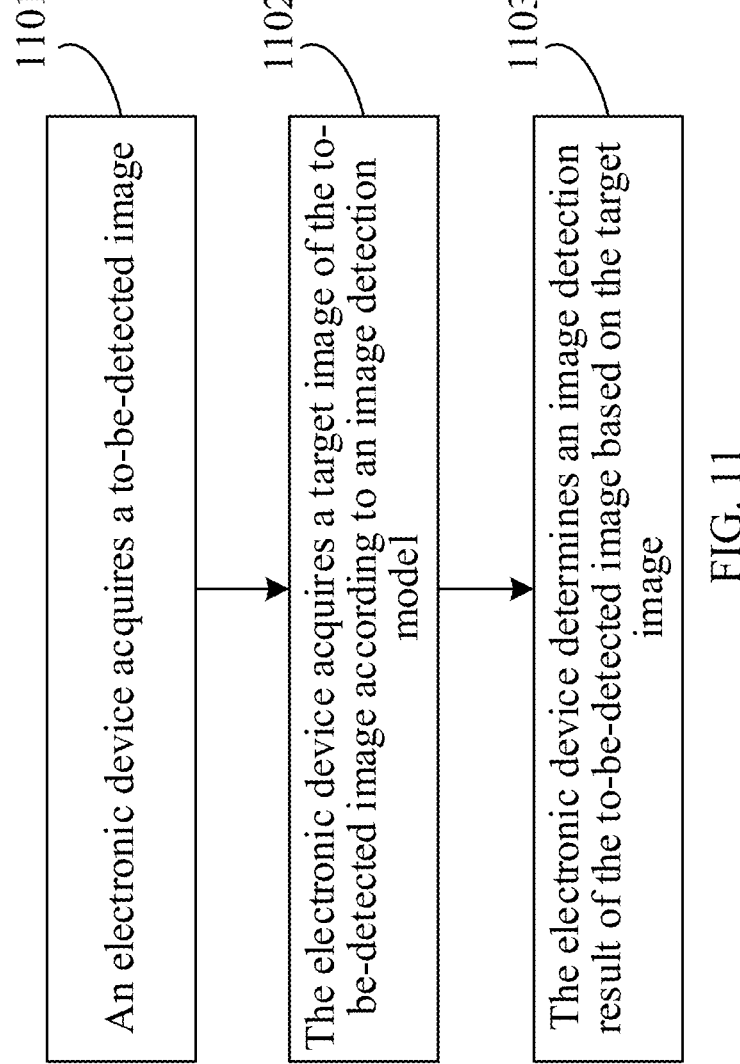
FIG. 11 is a flowchart of an image detection method provided by an embodiment of this application.

Based on the above implementation environment, the embodiment of this application further provides an image detection method. Taking the flowchart of an image detection method provided by the embodiment of this application shown in FIG. 11 as an example, the method is performed by the electronic device 11 shown in FIG. 1. As shown in FIG. 11, the method includes step 1101 to step 1103.

Step 1101: Acquire a to-be-detected image.

The embodiment of this application does not limit the to-be-detected image. Exemplarily, the to-be-detected image includes, but is not limited to, a brain image, a landscape image, a road image, a fetal image, a cell image, and the like. There is at least one to-be-detected image.

Step 1102: The electronic device acquires a target image of the to-be-detected image according to an image acquisition model.

The target image is a heat map of the to-be-detected image in Hough space. The image acquisition model is obtained by the image acquisition model training method shown according to the above method embodiments.

An image acquisition model training process includes: a label image pair of a sample image is acquired, the label image pair includes a first label image and a second label image, the first label image is a heat map of the sample image in image space, and the second label image is a heat map of the sample image in Hough space; a predicted image pair of the sample image is acquired according to the first network model, the predicted image pair includes a first predicted image and a second predicted image, the first predicted image is a heat map of the sample image obtained by the first network model in the image space, and the second predicted image is a heat map of the sample image obtained by the first network model in the Hough space; the first network model is adjusted based on the label image pair and the predicted image pair to obtain a second network model, so as to reduce a difference, obtained according to the second network model, between the predicted image pair and the label image pair; and the second network model is determined as an image acquisition model in response to the second network model satisfying a training termination condition.

In the embodiment of this application, the to-be-detected image is input into the image acquisition model, and the image acquisition model outputs a target image pair of the to-be-detected image. The target image of the to-be-detected image includes a first target image and a second target image. The first target image is a heat map of the to-be-detected image in image space. A value of any pixel in the first target image characterizes a probability of the pixel on a target line, on a target ellipse, or on a target plane. The second target image is a heat map of the to-be-detected image in Hough space. A value of any pixel in the second target image characterizes a probability of the pixel on a target line, on a target ellipse, or on a target plane. The second target image is a target image mentioned in step 1102.

The value of any pixel in the first target image characterizes the probability of the pixel on the target line (or on the target ellipse or on the target plane). If the target line is determined based on the first target image, then a plurality of points needs to be determined in the first target image, and a target line is formed by a plurality of points. Since there may be an error in determination of each point, the target line is prone to distortion, and the accumulation of errors of a plurality of points will lead to low accuracy of the target line. The value of any pixel in the second target image characterizes a probability of the pixel on the target line (or on the target ellipse or on the target plane). One pixel is determined from the second target image, and a standard target line may be determined, so the accuracy is high. Therefore, the method provided by the embodiment of this application takes the second target image as the target image during image detection, so that the accuracy of a subsequent image detection result is higher.

In a possible implementation, the to-be-detected image is a brain image, and the operation that the electronic device acquires a target image of the to-be-detected image according to an image acquisition model includes: the electronic device acquires a first image spatial feature of the brain image according to the image acquisition model, and the first image spatial feature of the brain image characterizes a feature of the brain image in the image space; a first Hough spatial feature of the brain image is determined based on the first image spatial feature of the brain image, and the first Hough spatial feature of the brain image characterizes a feature of the brain image in the Hough space; and a target image of the brain image is determined based on the first Hough spatial feature of the brain image.

In some embodiments, the image acquisition model includes a stem block network, an hourglass network, and a 3D DHT network. The stem block network extracts an initial feature of the brain image, and the hourglass network performs feature processing on the initial feature of the brain image to obtain a first image spatial feature of the brain image. The 3D DHT network performs Hough transform on the first image spatial feature of the brain image to obtain a first Hough spatial feature of the brain image, and performs 1×1×1 convolution and upsampling on the first Hough spatial feature to obtain the target image. For details, refer to the related descriptions about FIG. 8. Details are not further described herein.

In a possible implementation, the operation that the electronic device determines the target image of the brain image based on the first Hough spatial feature of the brain image includes: the electronic device determines a second image spatial feature of the brain image based on the first Hough spatial feature of the brain image and the first image spatial feature of the brain image; a second Hough spatial feature of the brain image is determined based on the second image spatial feature of the brain image; and a target image of the brain image is determined based on the second Hough spatial feature of the brain image.

In the embodiment of this application, after obtaining the first Hough spatial feature of the brain image, the image acquisition model determines a second image spatial feature of the brain image based on the first Hough spatial feature of the brain image and the first image spatial feature of the brain image first. Then, Hough transform is performed based on the second image spatial feature of the brain image to obtain a second Hough spatial feature of the brain image. After that, upsampling is performed based on the second Hough spatial feature of the brain image to obtain a target image.

In some embodiments, the image acquisition model includes a stem block network, an hourglass network, a 3D DHT network, a residual block network, a 3D IDHT network, and the like. The brain image is processed by the stem block network, the hourglass network, the 3D DHT network to obtain the first Hough spatial feature of the brain image. The first Hough spatial feature of the brain image is subjected to further Hough spatial feature extraction by two residual block networks first, and then is subjected to inverse Hough transform through the 3D IDHT network to obtain a third image spatial feature of the brain image.

After that, the electronic device fuses the third image spatial feature, the first image spatial feature, and the initial feature of the brain image to obtain a first fused feature. The hourglass network performs feature processing on the first fused feature to obtain a second image spatial feature of the brain image. The 3D DHT network performs Hough transform on the second image spatial feature of the brain image to obtain a second Hough spatial feature of the brain image, and performs 1×1×1 convolution and upsampling on the second Hough spatial feature to obtain the target image. For details, refer to the related descriptions about FIG. 8. Details are not further described herein.

The to-be-detected image may also be a landscape image, a road image, a fetal image, a cell image, and the like in addition to a brain image. A method for processing the landscape image, the road image, the fetal image, the cell image, and the like by the image acquisition model is similar to a method for processing the brain image by the image acquisition model, and a method for processing the to-be-detected image by the image acquisition model is similar to a method for processing the sample image by the first network model. For details, refer to the descriptions about the first network model. Details are not further described herein.

Step 1103: The electronic device determines an image detection result of the to-be-detected image based on the target image.

In the embodiment of this application, the target image is a heat map of the to-be-detected image in Hough space. A certain plane, line, or ellipse of the to-be-detected image is determined by determining a peak point in the target image, so as to obtain the image detection result.

In a possible implementation, the operation that the electronic device determines the image detection result of the to-be-detected image based on the target image includes: the electronic device performs non-maximum suppression processing on the target image to obtain at least one peak point in the target image; and an image detection result of the to-be-detected image is determined based on the at least one peak point in the target image.

The non-maximum suppression processing is to suppress elements that are not maximum values, which may be understood as local maximum value search. In the embodiment of this application, the target image is a heat map of the to-be-detected image in Hough space. The target image includes at least one Gaussian sphere. A maximum value of each Gaussian sphere is searched through the non-maximum suppression processing to obtain a peak point of the Gaussian sphere to obtain at least one peak point of the target image. Any peak point corresponds to one plane, line, or ellipse.

In some embodiments, the to-be-detected image is a brain image. The image detection result is a brain midline plane of the brain image. The to-be-detected image is a fetal image. The image detection result is at least one standard plane of the fetal image. Any standard plane characterizes any of a standard plane of a fetal head, a standard plane of a fetal abdomen, and a standard plane of a fetal femur. The to-be-detected image is a cell image. The image detection result is at least one ellipse of the cell image, and any ellipse characterizes a contour of a cell. The to-be-detected image is a photographic image. The image detection result is at least one strip of the photographic image, and at least one strip characterizes a structure of an object of the photographic image.

The to-be-detected image includes, but is not limited to, a brain image, a fetal image, a cell image, and a photographic image. The image detection results of the to-be-detected images are different according to different to-be-detected images. Different to-be-detected images and other image detection results are described in detail below from the perspectives of implementation B1 to implementation B4 respectively.

Implementation B1, a to-be-detected image is a brain image, and the operation that the electronic device determines an image detection result of the to-be-detected image based on the target image includes: a peak point in the target image is determined; and a brain midline plane is determined based on the peak point in the target image.

In the embodiment of this application, when the to-be-detected image is the brain image, the brain image is input into an image acquisition model to obtain a target image output by the image acquisition model. The target image is a heat map of a key point. A peak point of this key point is determined based on this key point in the target image to obtain a peak point in the target image. A planar equation is determined based on the peak point in the target image. The planar equation is the planar equation corresponding to the midline plane of the brain image.

Figure 12:
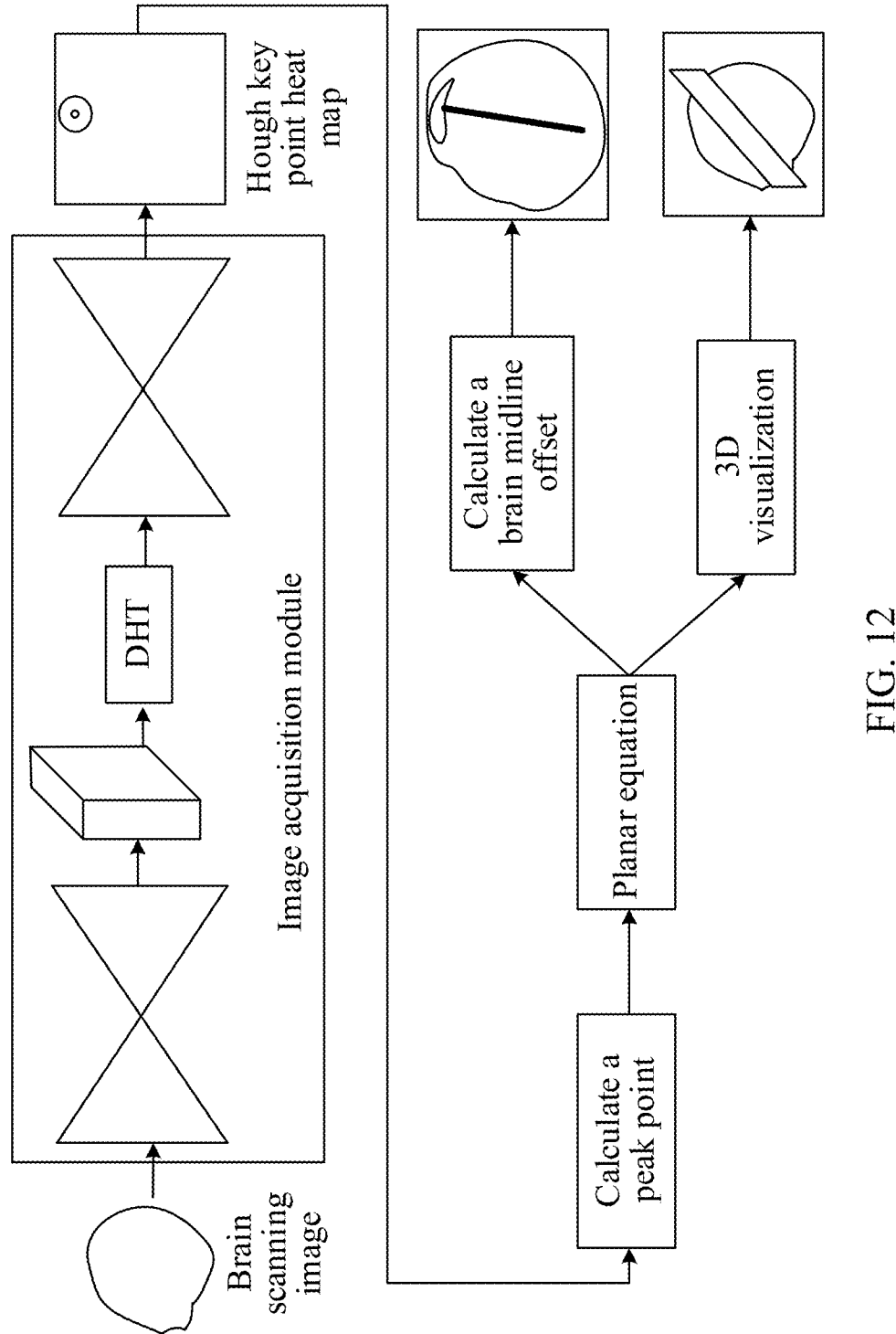
FIG. 12 is a schematic diagram of processing a brain scanning image provided by an embodiment of this application.

Refer to FIG. 12, which is a schematic diagram of processing a brain scanning image provided by an embodiment of this application. The embodiment of this application does not limit a structure of the image acquisition model. Exemplarily, the image acquisition model may be a model shown in FIG. 8. The to-be-detected image is the brain scanning image. The brain scanning image includes at least one brain image.

The electronic device inputs the brain scanning image into the image acquisition model. The image acquisition model outputs a Hough key point heat map (that is, a target image), and calculates a peak point of the Hough key point heat map. The peak point here includes three parameters, which are respectively $\varphi$, $\theta$, and $\rho$. Where, $\varphi$, $\theta$, and $\rho$ are three parameters of the plane in a polar coordinate system. A planar equation $Ax+By+Cz+D=0$ of the rectangular coordinate system is determined according to the planar equation $x \sin \varphi \cos \theta + y \sin \varphi \sin \theta + z \cos \varphi = \Sigma$ of the polar coordinate system to obtain a planar equation corresponding to the brain midline plane of the brain image. In one aspect, a brain midline offset is calculated based on the planar equation, and a 2D visual image is made based on the brain midline offset. A bold line in the 2D visual image represents a brain midline. In another aspect, 3D visualization is performed based on the planar equation to obtain a 3D visual image, and a parallelogram in the 3D visual image represents brain midline plane.

Implementation B2, a to-be-detected image is a fetal image, and the operation that the operation that the electronic device determines an image detection result of the to-be-detected image based on the target image includes: the electronic device determines each peak point in the target image; a standard plane corresponding to each peak point is determined based on each peak point in the target image; and the standard plane corresponding to any peak point characterizes any of a standard plane of a fetal head, a standard plane of a fetal abdomen, and a standard plane of a fetal femur.

In the embodiment of this application, when the to-be-detected image is the fetal image, the fetal image is input into an image acquisition model to obtain a target image output by the image acquisition model. The target image is a heat map of at least one key point. A peak point of each key point is determined based on each key point in the target image to obtain each peak point in the target image. A planar equation corresponding to each peak point is determined based on each peak point in the target image. The planar equation corresponding to any peak value is a planar equation corresponding to a standard plane of the fetal head, the standard plane of the fetal abdomen, and the standard plane of the fetal femur.

Figures 13, 14:
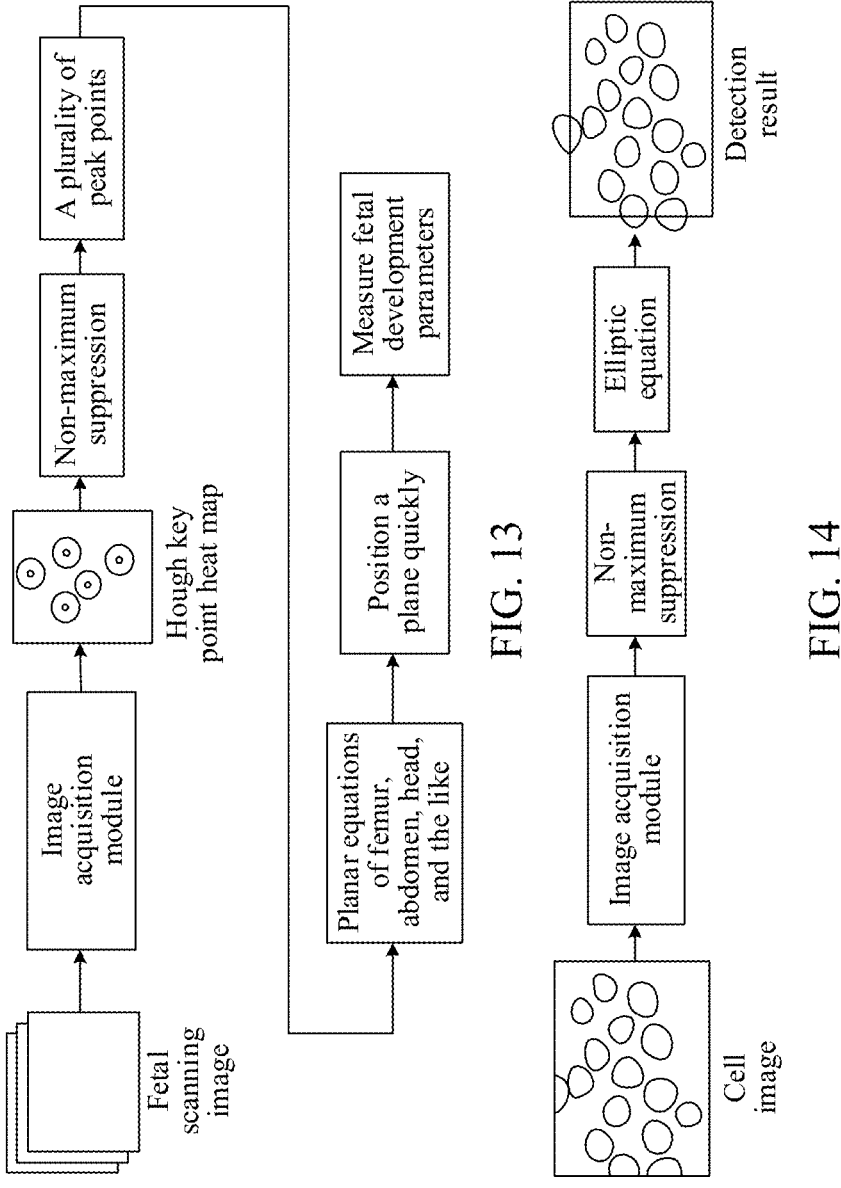
FIG. 13 is a schematic diagram of processing a fetal scanning image provided by an embodiment of this application.
FIG. 14 is a schematic diagram of processing a cell image provided by an embodiment of this application.

Refer to FIG. 13, which is a schematic diagram of processing a fetal scanning image provided by an embodiment of this application. The embodiment of this application does not limit a structure of the image acquisition model. Exemplarily, the image acquisition model may be a model shown in FIG. 8. The to-be-detected image is the fetal image. The fetal image includes at least one fetal image.

The electronic device inputs the fetal scanning image into the image acquisition model. The image acquisition model outputs a Hough key point heat map (that is, a target image). The Hough key point heat map is a heat map of a plurality of key points. Non-maximum suppression processing is performed on the Hough key point heat map to search a local maximum value, so as to determine a peak point of each key point to obtain a plurality of peak points. A planar equation corresponding to each peak point is determined to obtain planar equations of the femur, abdomen, and head of a fetus, so as to position a plane quickly and shorten film reading time to obtain the standard planes of the femur, abdomen, and head of the fetus. After that, fetal development parameters are measured based on the standard planes of the femur, abdomen, and head of the fetus to evaluate fetal development conditions.

Implementation B3, a to-be-detected image is a cell image, and the operation that the electronic device determines an image detection result of the to-be-detected image based on the target image includes: each peak point in the target image is determined; and an ellipse corresponding to each peak point is determined based on each peak point in the target image, and the ellipse corresponding to any peak point characterizes a contour of a cell.

In the embodiment of this application, when the to-be-detected image is the cell image, the cell image is input into an image acquisition model to obtain a target image output by the image acquisition model. The target image is a heat map of at least one key point. A peak point of each key point is determined based on each key point in the target image to obtain each peak point in the target image. An elliptic equation corresponding to each peak point is determined based on each peak point in the target image, and the elliptic equation corresponding to any peak point is an elliptic equation corresponding to the contour of the cell.

It is to be understood that the cell image includes at least one cell. The elliptic equation corresponding to the contour of each cell in the cell image can be determined based on the elliptic equation corresponding to each peak point, so as to detect each cell of the cell image.

Refer to FIG. 14, which is a schematic diagram of processing a cell image provided by an embodiment of this application. The embodiment of this application does not limit a structure of the image acquisition model. Exemplarily, the image acquisition model may be a model shown in FIG. 10. The to-be-detected image is the cell image. The cell image includes a plurality of cells.

The electronic device inputs the cell image into the image acquisition model. The image acquisition model outputs a Hough key point heat map (that is, a target image). The Hough key point heat map is a heat map of a plurality of key points. Non-maximum suppression processing is performed on the Hough key point heat map to search a local maximum value, so as to determine a peak point of each key point to obtain a plurality of peak points. The elliptic equation corresponding to each peak point is determined to obtain the elliptic equation corresponding to the contour of each cell in the cell image, so as to determine each cell in the cell image and obtain a detection result.

Implementation B4, a to-be-detected image is a photographic image, and the operation that the electronic device determines an image detection result of the to-be-detected image based on the target image includes: each peak point in the target image is determined; and a strip corresponding to each peak point is determined based on each peak point in the target image, and the strip corresponding to each peak point characterizes a structure of a photographic object.

In the embodiment of this application, when the to-be-detected image is the photographic image, the photographic image is input into an image acquisition model to obtain a target image output by the image acquisition model. The target image is a heat map of at least one key point. A peak point of each key point is determined based on each key point in the target image to obtain each peak point in the target image. A linear equation, an elliptic equation, and the like corresponding to each peak point is determined based on each peak point in the target image, so as to obtain a strip corresponding to each peak point (a line, an ellipse, or the like). The strip corresponding to any peak point is a strip of the photographic object, and the strip corresponding to each peak point may characterize a structure of the photographic object.

It is to be understood that when the photographic image is a road image. A strip corresponding to any peak point may be a strip of a road edge, and a strip of a road sign in the road (such as a straight road sign, a left turn sign, and the like). The strip corresponding to each peak point may be a structure that can characterize the road.

Figure 15:
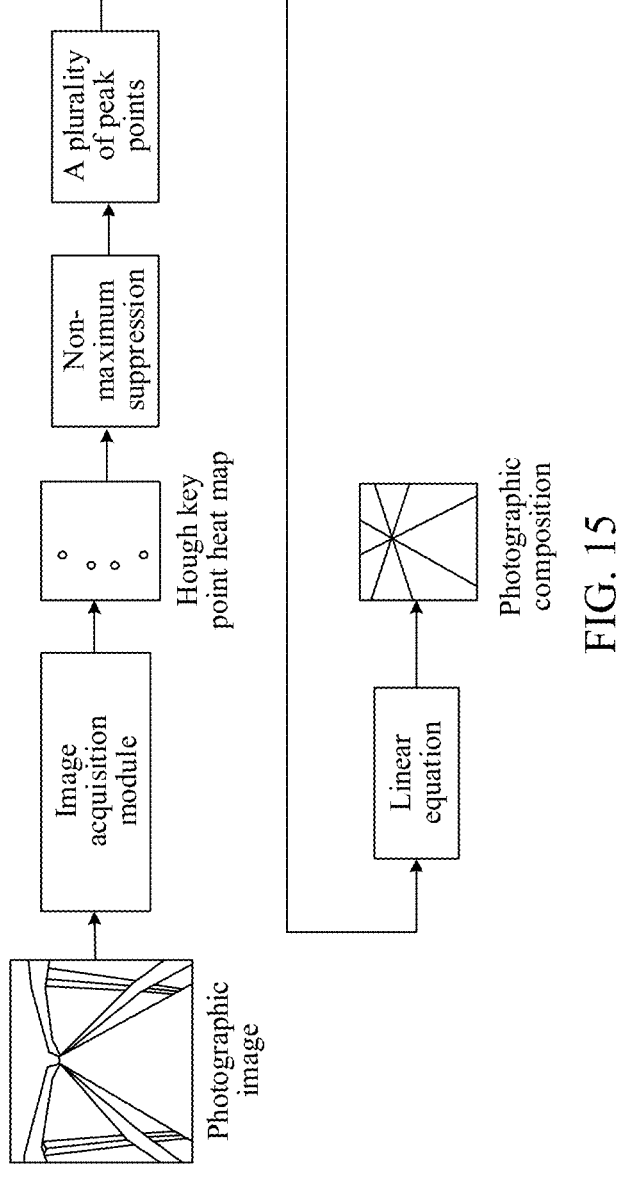
FIG. 15 is a schematic diagram of processing a photographic image provided by an embodiment of this application.

Refer to FIG. 15, which is a schematic diagram of processing a photographic image provided by an embodiment of this application. The embodiment of this application does not limit a structure of the image acquisition model. Exemplarily, the image acquisition model may be a model shown in FIG. 10. The to-be-detected image is the cell image. The to-be-detected image is a photographic image.

The electronic device inputs the photographic image into the image acquisition model. The image acquisition model outputs a Hough key point heat map (that is, a target image). The Hough key point heat map is a heat map of a plurality of key points. Non-maximum suppression processing is performed on the Hough key point heat map to search a local maximum value, so as to determine a peak point of each key point to obtain a plurality of peak points. A linear equation corresponding to each peak point is determined to obtain each linear equation corresponding to the photographic image, so as to obtain a plurality of lines, that is, to obtain a photographic composition.

The image acquisition model in the above method is obtained by training based on the heat map of the sample image in the Hough space and the heat map of the sample image in the image space, so that the image acquisition model learns key point features of the Hough space and the semantic features of the image space, can quickly and accurately determine the heat map of an image in the Hough space, and can accurately determine an image detection result based on the heat map of the image in the Hough space, thereby improving the accuracy of subsequent analysis processing.

Figure 16:
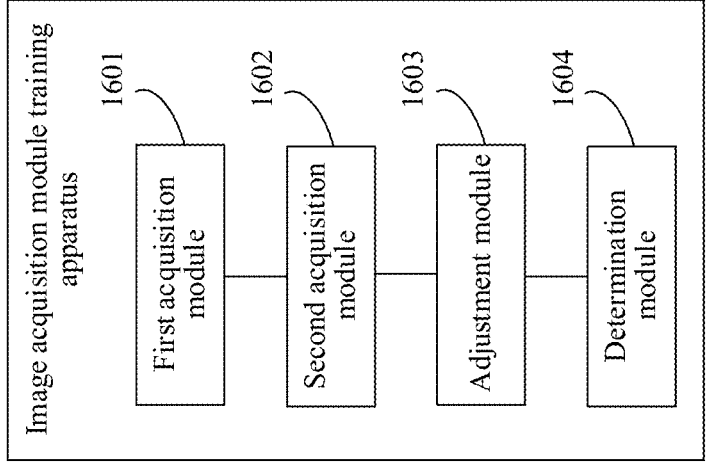
FIG. 16 is a schematic structural diagram of an image acquisition model training apparatus provided by an embodiment of this application.

FIG. 16 is a schematic structural diagram of an image acquisition model training apparatus provided by an embodiment of this application. As shown in FIG. 16, the apparatus includes:

a first acquisition module 1601, configured to acquire a label image pair of a sample image, the label image pair including a first label image and a second label image, the first label image being a heat map of the sample image in image space, and the second label image being a heat map of the sample image in Hough space;

a second acquisition module 1602, configured to acquire a predicted image pair of the sample image according to the first network model, the predicted image pair including a first predicted image and a second predicted image, the first predicted image being a heat map of the sample image obtained by the first network model in the image space, and the second predicted image being a heat map of the sample image obtained by the first network model in the Hough space;

an adjustment module 1603, configured to adjust the first network model based on the label image pair and the predicted image pair to obtain a second network model, so as to reduce a difference, obtained according to the second network model, between the predicted image pair and the label image pair; and a determination module 1604, configured to determine the second network model as an image acquisition model in response to the second network model satisfying a training termination condition.

In a possible implementation, the second acquisition module 1602 is configured to: acquire a first image spatial feature of the sample image, the first image spatial feature characterizing a feature of the sample image in the image space; determine the first predicted image based on the first image spatial feature; determine a first Hough spatial feature based on the first image spatial feature, the first Hough spatial feature characterizing a feature of the sample image in the Hough space; and determine the second predicted image based on the first Hough spatial feature.

In a possible implementation, the second acquisition module 1602 is configured to: perform rectification on the first image spatial feature to obtain a rectified first image spatial feature; and determine the first Hough spatial feature based on the rectified first image spatial feature.

In a possible implementation, the adjustment module 1603 is configured to: determine a loss value of the first network model based on the label image pair and the predicted image pair, the loss value of the first network model representing a difference between the predicted image pair and the label image pair; and adjust the first network model based on the loss value of the first network model to obtain the second network model, so as to reduce the difference, obtained according to the second network model, between the predicted image pair and the label image pair.

In a possible implementation, the second acquisition module 1602 is further configured to: determine a second image spatial feature based on the first Hough spatial feature and the first image spatial feature; determine a third predicted image based on the second image spatial feature, and the third predicted image being a heat map of the sample image obtained by the first network model in the image space; determine a second Hough spatial feature based on the second image spatial feature; and determine a fourth predicted image based on the second Hough spatial feature, and the fourth predicted image being a heat map of the sample image obtained by the first network model in the Hough space.

The adjustment module 1603 is configured to: adjust the first network model based on the label image pair, the predicted image pair, the third predicted image, and the fourth predicted image to obtain the second network model, so as to reduce the difference, obtained according to the second network model, between the predicted image pair and the label image pair, and reduce the difference between an image pair composed of the third predicted image and the fourth predicted image and the label image pair.

In a possible implementation, the second acquisition module 1602 is configured to: determine a third image spatial feature based on the first Hough spatial feature; fuse the first image spatial feature and the third image spatial feature to obtain a first fused feature; and determine a second image spatial feature based on the first fused feature.

In a possible implementation, the adjustment module 1603 is configured to: obtain a first loss value according to the label image pair and the predicted image pair, the first loss value representing the difference between the predicted image pair and the label image pair; obtain a second loss value according to the label image pair, the third predicted image, and the fourth predicted image, the second loss value representing the difference between the image pair composed of the third predicted image and the fourth predicted image and the label image pair; obtain a loss value of the first network model based on the first loss value and the second loss value; and adjust the first network model based on the loss value of first network model to obtain a second network model, so as to reduce the difference, obtained according second network model, between the predicted image pair and the label image pair, and reduce the difference between the image pair composed of the third predicted image and the fourth predicted image and the label image pair.

In a possible implementation, the first image spatial feature includes at least two sub-image spatial features.

The second acquisition module 1602 is configured to determine the first predicted image based on the at least two sub-image spatial features.

In a possible implementation, the second acquisition module 1602 is configured to determine, for a sub-image spatial feature of the at least two sub-image spatial features, a sub-Hough spatial feature corresponding to the sub-image spatial feature, the first Hough spatial feature including a sub-Hough spatial feature corresponding to each sub-image spatial feature; and determine the second predicted image based on the sub-Hough spatial feature corresponding to each sub-image spatial feature.

In a possible implementation, the second acquisition module 1602 is configured to determine, for a sub-image spatial feature other than the first sub-image spatial feature of the at least two sub-image spatial features, a second fused feature corresponding to the sub-image spatial feature based on the sub-image spatial feature and a previous sub-image spatial feature of the sub-image spatial feature; and determine a sub-Hough spatial feature corresponding to the sub-image spatial feature based on the second fused feature corresponding to the sub-image spatial feature and the previous sub-image spatial feature.

In a possible implementation, the second acquisition module 1602 is configured to: determine a second fused feature corresponding to the previous sub-image spatial feature based on the previous sub-image spatial feature; determine a fourth image spatial feature based on the second fused feature corresponding to the previous sub-image spatial feature; determine a third Hough spatial feature based on the fourth image spatial feature; and determine the second fused feature corresponding to the sub-image spatial feature based on the sub-image spatial feature, the third Hough spatial feature, and the second fused feature corresponding to the previous sub-image spatial feature.

In a possible implementation, the second acquisition module 1602 is configured to: determine a sub-Hough spatial feature corresponding to the previous sub-image spatial feature based on the previous sub-image spatial feature; determine the sub-Hough spatial feature corresponding to the second fused feature based on the second fused feature corresponding to the sub-image spatial feature; and determine a sub-Hough spatial feature corresponding to the sub-image spatial feature based on the sub-Hough spatial feature corresponding to the second fused feature and the sub-Hough spatial feature corresponding to the previous sub-image spatial feature.

The image acquisition model in the above apparatus is obtained by training based on the heat map of the sample image in the Hough space and the heat map of the sample image in the image space, so that the image acquisition model learns key point features of the Hough space and the semantic features of the image space, can quickly and accurately determine the heat map of an image in the Hough space, and can accurately determine an image detection result based on the heat map of the image in the Hough space, thereby improving the accuracy of subsequent analysis processing.

It is to be understood that: when the apparatus provided in FIG. 16 above realizes the functions of the apparatus, only division of the foregoing function modules is used as an example for description. In an actual application, the above functions may be allocated to and completed by different function modules according to requirements. That is, an internal structure of the device is divided into different function modules to complete all or some of the functions described above. In addition, the apparatuses provided by the above embodiments and the method embodiments fall within the same conception. For details of a specific implementation process, refer to the method embodiments. Details are not further described herein.

Figure 17:
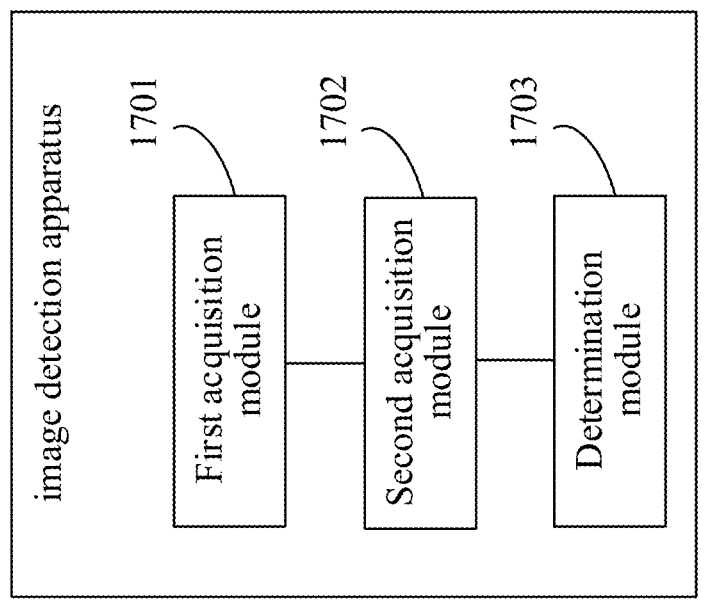
FIG. 17 is a schematic structural diagram of an image detection apparatus provided by an embodiment of this application.

FIG. 17 is a schematic structural diagram of an image detection apparatus provided by an embodiment of this application. As shown in FIG. 17, the apparatus includes:

a first acquisition module 1701, configured to acquire a to-be-detected image;

a second acquisition module 1702, configured to acquire a target image of the to-be-detected image according to an image acquisition model, the target image being a heat map of the to-be-detected image in Hough space; and a determination module 1703, configured to determine an image detection result of the to-be-detected image based on the target image.

An image acquisition model training process includes:

a label image pair of a sample image is acquired, the label image pair includes a first label image and a second label image, the first label image is a heat map of the sample image in image space, and the second label image is a heat map of the sample image in Hough space;

a predicted image pair of the sample image is acquired according to the first network model, the predicted image pair includes a first predicted image and a second predicted image, the first predicted image is a heat map of the sample image obtained by the first network model in the image space, and the second predicted image is a heat map of the sample image obtained by the first network model in the Hough space;

the first network model is adjusted based on the label image pair and the predicted image pair to obtain a second network model, so as to reduce a difference, obtained according to the second network model, between the predicted image pair and the label image pair; and the second network model is determined as an image acquisition model in response to the second network model satisfying a training termination condition.

In a possible implementation, the to-be-detected image is a brain image, the second acquisition module 1702 is configured to: acquire a first image spatial feature of the sample image according to the image acquisition model, the first image spatial feature of the brain image characterizing a feature of the sample image in the image space; determine a first Hough spatial feature of the brain image based on the first image spatial feature of the brain image, and the first Hough spatial feature of the brain image characterizing a feature of the brain image in the Hough space; and determine a target image of the brain image based on the first Hough spatial feature of the brain image.

In a possible implementation, the second acquisition module 1702 is configured to: determine a second image spatial feature of the brain image based on the first Hough spatial feature of the brain image and the first image spatial feature of the brain image; determine a second Hough spatial feature of the brain image based on the second image spatial feature of the brain image; and determine a target image of the brain image based on the second Hough spatial feature of the brain image.

In a possible implementation, the determination module 1703 is configured to perform non-maximum suppression processing on the target image to obtain at least one peak point in the target image; and an image detection result of the to-be-detected image is determined based on the at least one peak point in the target image.

The image acquisition model in the above apparatus is obtained by training based on the heat map of the sample image in the Hough space and the heat map of the sample image in the image space, so that the image acquisition model learns key point features of the Hough space and the semantic features of the image space, can quickly and accurately determine the heat map of an image in the Hough space, and can accurately determine an image detection result based on the heat map of the image in the Hough space, thereby improving the accuracy of subsequent analysis processing.

It is to be understood that: when the apparatus provided in the FIG. 17 above realizes the functions of the apparatus, only division of the above function modules is used as an example for description. In an actual application, the above functions may be allocated to and completed by different function modules according to requirements. That is, an internal structure of the device is divided into different function modules to complete all or some of the functions described above. In addition, the apparatuses provided by the above embodiments and the method embodiments fall within the same conception. For details of a specific implementation process, refer to the method embodiments. Details are not further described herein.

Figures 18, 19:
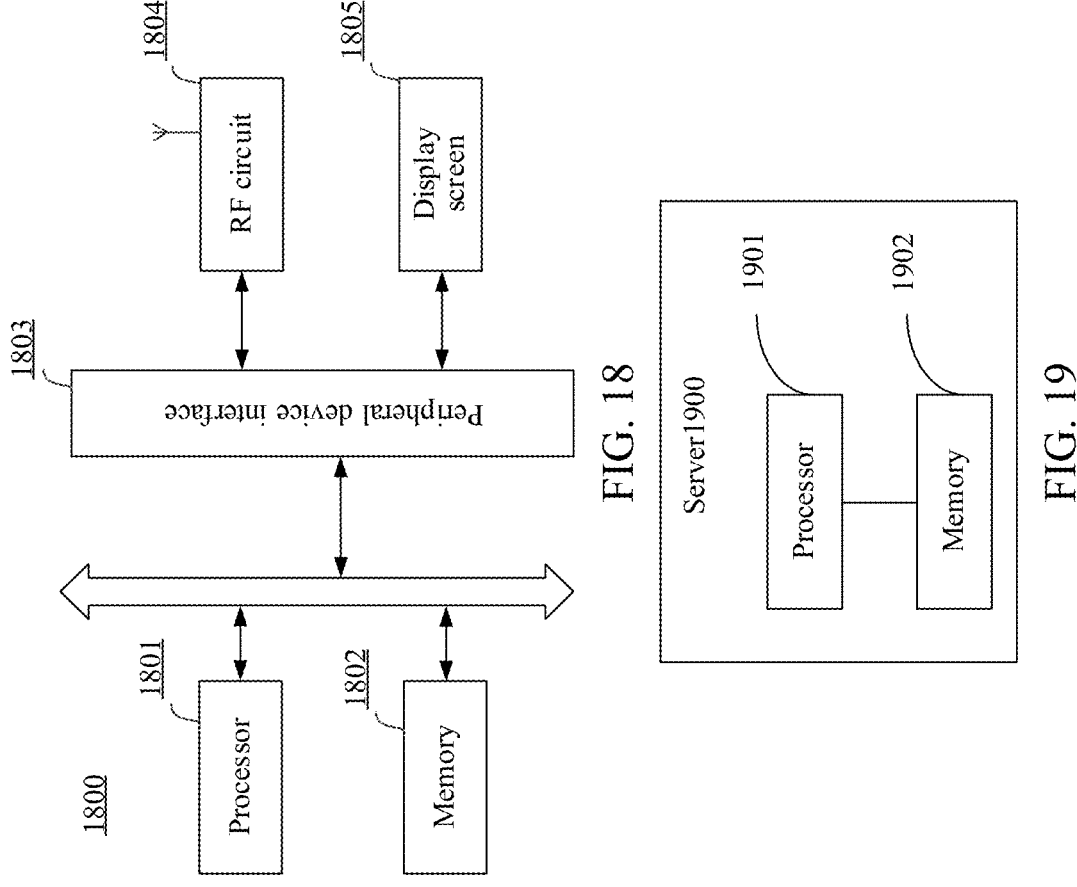
FIG. 18 is a schematic structural diagram of a terminal device provided by an embodiment of this application.
FIG. 19 is a schematic structural diagram of a server provided by an embodiment of this application.

FIG. 18 shows a structural block diagram of a terminal device 1800 provided by an exemplary embodiment of this application. The terminal device 1800 may be a portable mobile terminal, for example: a smartphone, a tablet computer, an MP3 player, an MP4 player, a notebook computer, or a desktop computer. The terminal 1800 may also be referred to as another name such as user equipment, a portable terminal, a laptop terminal, or a desktop terminal.

Generally, the terminal 1800 includes: a processor 1801 and a memory 1802.

The processor 1801 may include one or more processing cores, for example, a 4-core processor or an 8-core processor. The processor 1801 may be implemented by using at least one hardware form of a digital signal processor (DSP), a field-programmable gate array (FPGA), or a programmable logic array (PLA). The processor 1801 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1801 may be integrated with a graphics processing unit (GPU). The GPU is configured to render and draw content that needs to be displayed on a display screen. In some embodiments, the processor 1801 may further include an artificial intelligence (AI) processor. The AI processor is configured to process computing operations related to machine learning.

The memory 1802 may include one or more computer-readable storage media. The computer-readable storage medium may be non-transient. The memory 1802 may further include a high-speed random access memory and a nonvolatile memory, for example, one or more disk storage devices or flash storage devices. In some embodiments, the non-transitory computer-readable storage medium in the memory 1802 is configured to store at least one instruction, and the at least one instruction being configured to be executed by the processor 1801 to implement the image acquisition model training method or the image detection method provided by the method embodiments of this application.

In some embodiments, optionally, the terminal 1800 further includes: a peripheral device interface 1803 and at least one peripheral device. The processor 1801, the memory 1802, and the peripheral device interface 1803 may be connected through a bus or a signal cable. Each peripheral device may be connected to the peripheral device interface 1803 through a bus, a signal cable, or a circuit board. Specifically, the peripheral device includes: at least one of a radial frequency (RF) circuit 1804 and a display screen 1805.

The peripheral interface 1803 may be configured to connect the at least one peripheral device related to an input/output (I/O) to the processor 1801 and the memory 1802. In some embodiments, the processor 1801, the memory 1802, and the peripheral device interface 1803 are integrated on the same core or circuit board. In some embodiments, any one or two of the processor 1801, the memory 1802, and the peripheral device interface 1803 may be implemented on a single chip or circuit board indecently. No limits are made thereto in this embodiment.

The RF circuit 1804 is configured to receive and transmit an RF signal, also referred to as an electromagnetic signal. The RF circuit 1804 communicates with a communication network and other communication devices through the electromagnetic signal. The RF circuit 1804 converts an electric signal into an electromagnetic signal for transmission, or converts a received electromagnetic signal into an electric signal. In some embodiments, the RF circuit 1804 includes: an antenna system, an RF transceiver, one or more amplifiers, a tuner, an oscillator, a digital signal processor, a codec chip set, a subscriber identity module card, and the like. The RF circuit 1804 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF 1804 may further include a circuit related to near field communication (NFC). No limits are made thereto in this application.

The display screen 1805 is configured to display a user interface (UI). The UI may include a graph, text, an icon, a video, and any combination thereof. When the display screen 1805 is a touch display screen, the display screen 1805 further has a capability of acquiring a touch signal on or above a surface of the display screen 1805. The touch signal may be inputted to the processor 1801 as a control signal for processing. In this case, the display screen 1805 may be further configured to provide a virtual button and/or a virtual keyboard that are/is also referred to as a soft button and/or a soft keyboard. In some embodiments, there may be one display screen 1805 arranged on a front panel of the terminal device 1800. In some another embodiments, there may be at least two display screens 1805 respectively arranged on different surfaces of the terminal device 1800 or designed in a folded manner. In some another embodiments, the display screen 1805 may be a flexible display screen, arranged on a bent surface or a folded surface of the terminal device 1800. Even, the display screen 1805 may be further set in a non-rectangular irregular pattern, namely, a special-shaped screen. The display screen 1805 may be prepared by using materials such as a liquid crystal display (LCD), an organic light-emitting diode (OLED), or the like.

A person skilled in the art may understand that the structure shown in FIG. 18 does not constitute a limitation to the terminal device 1800, and may include more or fewer components than those shown in the figure, or combine some components, or use different component arrangement.

FIG. 19 is a schematic structural diagram of a server provided by an embodiment of this application. The server 1900 may vary a lot due to different configurations or performance, and may include one or more processors 1901 and one or more memories 1902. The one or more memories 1902 store at least one program code. The at least one program code is loaded and executed by the one or more processors 1901 to implement the image acquisition model training method or image detection method provided by various method embodiments above. Exemplarily, the processor 1901 is a CPU. Of course, the server 1900 may further have components such as a wired or wireless network interface, a keyboard, and an I/O interface to facilitate input and output. The server 1900 may further include another component configured to implement a function of a device. Details are not further described herein.

In an exemplary embodiment, an electronic device is further provided. The electronic device includes a processor and a memory, the memory stores at least one program code, and the at least one program code is loaded and executed by the processor to enable the electronic device to implement the following operations:

acquiring a label image pair of a sample image, the label image pair including a first label image and a second label image, the first label image being a heat map of the sample image in image space, and the second label image being a heat map of the sample image in Hough space;

acquiring a predicted image pair of the sample image according to the first network model, the predicted image pair including a first predicted image and a second predicted image, the first predicted image being a heat map of the sample image obtained by the first network model in the image space, and the second predicted image being a heat map of the sample image obtained by the first network model in the Hough space;

adjusting the first network model based on the label image pair and the predicted image pair to obtain a second network model, so as to reduce a difference, obtained according to the second network model, between the predicted image pair and the label image pair; and determining the second network model as an image acquisition model in response to the second network model satisfying a training termination condition.

In a possible implementation, the at least one program code is loaded and executed by the processor to enable the electronic device to implement the following operations:

acquiring a first image spatial feature of the sample image, the first image spatial feature characterizing a feature of the sample image in the image space;

determining the first predicted image based on the first image spatial feature;

determining a first Hough spatial feature based on the first image spatial feature, the first Hough spatial feature characterizing a feature of the sample image in the Hough space; and determining the second predicted image based on the first Hough spatial feature.

In a possible implementation, the at least one program code is loaded and executed by the processor to enable the electronic device to implement the following operations:

performing rectification on the first image spatial feature to obtain a rectified first image spatial feature; and determining the first Hough spatial feature based on the rectified first image spatial feature.

In a possible implementation, the at least one program code is loaded and executed by the processor to enable the electronic device to implement the following operations:

determining a loss value of the first network model based on the label image pair and the predicted image pair, the loss value of the first network model representing a difference between the predicted image pair and the label image pair; and adjusting the first network model based on the loss value of the first network model to obtain the second network model, so as to reduce the difference, obtained according to the second network model, between the predicted image pair and the label image pair.

In a possible implementation, the at least one program code is loaded and executed by the processor to enable the electronic device to implement the following operations:

determining the second image spatial feature based on the first Hough spatial feature and the first image spatial feature includes:

determining a third predicted image based on the second image spatial feature, and the third predicted image being a heat map of the sample image obtained by the first network model in the image space;

determining a second Hough spatial feature based on the second image spatial feature; and determining a fourth predicted image based on the second Hough spatial feature, and the fourth predicted image being a heat map of the sample image obtained by the first network model in the Hough space; and adjusting the first network model based on the label image pair, the predicted image pair, the third predicted image, and the fourth predicted image to obtain the second network model, so as to reduce the difference, obtained according to the second network model, between the predicted image pair and the label image pair, and reduce the difference between an image pair composed of the third predicted image and the fourth predicted image and the label image pair.

In a possible implementation, the at least one program code is loaded and executed by the processor to enable the electronic device to implement the following operations:

determining a third image spatial feature based on the first Hough spatial feature;

fusing the first image spatial feature and the third image spatial feature to obtain a first fused feature; and determining a second image spatial feature based on the first fused feature.

In a possible implementation, the at least one program code is loaded and executed by the processor to enable the electronic device to implement the following operations:

obtaining a first loss value according to the label image pair and the predicted image pair, the first loss value representing a difference between the predicted image pair and the label image pair; and obtaining a second loss value according to the label image pair, the third predicted image, and the fourth predicted image, the second loss value representing the difference between the image pair composed of the third predicted image and the fourth predicted image and the label image pair;

obtaining a loss value of the first network model based on the first loss value and the second loss value; and adjusting the first network model based on the loss value of first network model to obtain a second network model, so as to reduce the difference, obtained according second network model, between the predicted image pair and the label image pair, and reduce the difference between the image pair composed of the third predicted image and the fourth predicted image and the label image pair.

In a possible implementation, the first image spatial feature includes at least two sub-image spatial features. The at least one program code is loaded and executed by the processor to enable the electronic device to implement the following operations:

determining the first predicted image based on the at least two sub-image spatial features.

In a possible implementation, the at least one program code is loaded and executed by the processor to enable the electronic device to implement the following operations:

for a sub-image spatial feature of the at least two sub-image spatial features, determining a sub-Hough spatial feature corresponding to the sub-image spatial feature, the first Hough spatial feature including the sub-Hough spatial feature corresponding to the sub-image spatial feature; and determining the second predicted image based on the sub-Hough spatial feature corresponding to each sub-image spatial feature.

In a possible implementation, the first image spatial feature includes at least two sub-image spatial features. The first Hough spatial feature includes the sub-Hough spatial feature corresponding to each sub-image spatial feature. The at least one program code is loaded and executed by the processor to enable the electronic device to implement the following operations:

for a sub-image spatial feature other than the first sub-image spatial feature of the at least two sub-image spatial features, determining a second fused feature corresponding to the sub-image spatial feature based on the sub-image spatial feature and a previous sub-image spatial feature of the sub-image spatial feature; and determining a sub-Hough spatial feature corresponding to the sub-image spatial feature based on the second fused feature corresponding to the sub-image spatial feature and the previous sub-image spatial feature.

In a possible implementation, the at least one program code is loaded and executed by the processor to enable the electronic device to implement the following operations:

determining the second fused feature corresponding to the previous sub-image spatial feature based on the previous sub-image spatial feature;

determining a fourth image spatial feature based on the second fused feature corresponding to the previous sub-image spatial feature;

determining a third Hough spatial feature based on the fourth image spatial feature; and determining the second fused feature corresponding to the sub-image spatial feature based on the sub-image spatial feature, the third Hough spatial feature, and the second fused feature corresponding to the previous sub-image spatial feature.

In a possible implementation, the at least one program code is loaded and executed by the processor to enable the electronic device to implement the following operations:

determining the sub-Hough spatial feature corresponding to the previous sub-image spatial feature based on the previous sub-image spatial feature;

determining the sub-Hough spatial feature corresponding to the second fused feature based on the second fused feature corresponding to the sub-image spatial feature; and determining a sub-Hough spatial feature corresponding to the sub-image spatial feature based on the sub-Hough spatial feature corresponding to the second fused feature and the sub-Hough spatial feature corresponding to the previous sub-image spatial feature.

In an exemplary embodiment, an electronic device is further provided. The electronic device includes a processor and a memory, the memory stores at least one program code, and the at least one program code is loaded and executed by the processor to enable the electronic device to implement the following operations:

obtaining a to-be-detected image;

acquiring a target image of the to-be-detected image according to an image acquisition model, the target image being a heat map of the to-be-detected image in Hough space; and determining an image detection result of the to-be-detected image based on the target image.

An image acquisition model training process includes:

acquiring a label image pair of a sample image, the label image pair including a first label image and a second label image, the first label image being a heat map of the sample image in image space, and the second label image being a heat map of the sample image in Hough space;

acquiring a predicted image pair of the sample image according to the first network model, the predicted image pair including a first predicted image and a second predicted image, the first predicted image being a heat map of the sample image obtained by the first network model in the image space, and the second predicted image being a heat map of the sample image obtained by the first network model in the Hough space;

adjusting the first network model based on the label image pair and the predicted image pair to obtain a second network model, so as to reduce a difference, obtained according to the second network model, between the predicted image pair and the label image pair; and determining the second network model as an image acquisition model in response to the second network model satisfying a training termination condition.

In a possible implementation, the at least one program code is loaded and executed by the processor to enable the electronic device to implement the following operations:

acquiring a first image spatial feature of a brain image according to an image acquisition model, the first image spatial feature of the brain image characterizing a feature of the brain image in image space;

determining a first Hough spatial feature of the brain image based on the first image spatial feature of the brain image, the first Hough spatial feature of the brain image characterizing a feature of the brain image in Hough space; and determining a target image of the brain image based on the first Hough spatial feature of the brain image.

In a possible implementation, the at least one program code is loaded and executed by the processor to enable the electronic device to implement the following operations:

determining a second image spatial feature of the brain image based on the first Hough spatial feature of the brain image and the first image spatial feature of the brain image;

determining a second Hough spatial feature of the brain image based on the second image spatial feature of the brain image; and determining a target image of the brain image based on the second Hough spatial feature of the brain image.

In a possible implementation, the at least one program code is loaded and executed by the processor to enable the electronic device to implement the following operations:

performing non-maximum suppression processing on the target image to obtain at least one peak point in the target image; and determining an image detection result of the to-be-detected image based on the at least one peak point in the target image.

In an exemplary embodiment, a non-transitory computer-readable storage medium is further provided. The storage medium stores at least one program code. The at least one program code is loaded and executed by a processor to enable an electronic device to implement any of the above image acquisition model training method or image detection method.

In some embodiments, the above computer-readable storage medium may be a read-only memory (ROM), a random access memory (RAM), a compact disc ROM (CD-ROM), a magnetic tape, a floppy disk, an optical data storage device, or the like.

In an exemplary embodiment, a computer program or a computer program product is further provided. The computer program or the computer program product stores at least one computer instruction. The at least one computer instruction is loaded and executed by a processor to enable the electronic device to implement any of the above image acquisition model training method or image detection method.

It is to be understood that "a plurality of" mentioned herein refers to two or more. "And/or" describes an association relationship for describing associated objects and represents that three relationships may exist. For example, A and/or B may represent: three cases, that is, only A exists, both A and B exist, and only B exists. The character "/" generally indicates an "or" relationship between the associated objects before and after.

Numbers in the above embodiments of this application are merely for description, but do not represent the superiority or inferiority of the embodiments.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Modules implemented in software are stored in memory or non-transitory computer-readable medium. The software modules, which include computer instructions or computer code, stored in the memory or medium can run on a processor or circuitry (e.g., ASIC, PLA, DSP, FPGA, or any other integrated circuit) capable of executing computer instructions or computer code. Each module can be implemented using one or more processors (or processors and memory). Likewise, a processor (or processors and memory) can be used to implement one or more modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices. The above are merely exemplary embodiments of this application, but are not intended to limit this application. Any modification, equivalent replacement, or improvement made within the spirit and principle of this application shall fall within the scope of protection of this application.

What is claimed is:

1. An image acquisition model training method, comprising:

acquiring, by an electronic device, a label image pair of a sample image, the label image pair comprising a first label image and a second label image, the first label image being a heat map of the sample image in image space, and the second label image being a heat map of the sample image in Hough space;

acquiring, by the electronic device, a predicted image pair of the sample image according to a first network model, the predicted image pair comprising a first predicted image and a second predicted image, the first predicted image being a heat map of the sample image obtained by the first network model in the image space, and the second predicted image being a heat map of the sample image obtained by the first network model in the Hough space, further comprising:

acquiring, by the electronic device, a first image spatial feature of the sample image in the image space, the first image spatial feature comprising at least two sub-image spatial features;

determining, by the electronic device, the first predicted image based on the at least two sub-image spatial features;

determining, by the electronic device, a first Hough spatial feature of the sample image in the Hough space based on the first image spatial feature; and determining, by the electronic device, the second predicted image based on the first Hough spatial feature;

adjusting, by the electronic device, the first network model based on the label image pair and the predicted image pair to obtain a second network model, so as to reduce a difference, obtained according to the second network model, between the predicted image pair and the label image pair; and determining, by the electronic device, the second network model as an image acquisition model in response to the second network model satisfying a training termination condition.

2. The method according to claim 1, wherein the determining, by the electronic device, the first Hough spatial feature of the sample image in the Hough space based on the first image spatial feature comprises:

performing rectification, by the electronic device, on the first image spatial feature to obtain a rectified first image spatial feature; and determining, by the electronic device, the first Hough spatial feature based on the rectified first image spatial feature.

3. The method according to claim 1, further comprising:

determining, by the electronic device, the second image spatial feature of the sample image in the image space based on the first Hough spatial feature and the first image spatial feature;

determining, by the electronic device, a third predicted image based on the second image spatial feature, the third predicted image being a heat map of the sample image obtained by the first network model in the image space;

determining, by the electronic device, a second Hough spatial feature of the sample image in the Hough space based on the second image spatial feature;

determining, by the electronic device, a fourth predicted image based on the second Hough spatial feature, the fourth predicted image being a heat map of the sample image obtained by the first network model in the Hough space;

adjusting, by the electronic device, the first network model based on the label image pair, the predicted image pair, the third predicted image, and the fourth predicted image to obtain the second network model, so as to reduce the difference, obtained according to the second network model, between the predicted image pair and the label image pair, and reduce the difference between an image pair composed of the third predicted image and the fourth predicted image and the label image pair.

4. The method according to claim 1, wherein the determining, by the electronic device, the first Hough spatial feature based on the first image spatial feature comprises:

for a sub-image spatial feature of the at least two sub-image spatial features, determining, by the electronic device, a sub-Hough spatial feature corresponding to the sub-image spatial feature, the first Hough spatial feature comprising the sub-Hough spatial feature corresponding to the sub-image spatial feature; and the determining, by the electronic device, the second predicted image based on the first Hough spatial feature comprises:

determining, by the electronic device, the second predicted image based on the sub-Hough spatial feature corresponding to each sub-image spatial feature.

5. The method according to claim 1, wherein the determining, by the electronic device, the first Hough spatial feature based on the first image spatial feature comprises:

for a sub-image spatial feature other than the first sub-image spatial feature of the at least two sub-image spatial features, determining a second fused feature corresponding to the sub-image spatial feature based on the sub-image spatial feature and a previous sub-image spatial feature of the sub-image spatial feature; and determining, by the electronic device, a sub-Hough spatial feature corresponding to the sub-image spatial feature based on the second fused feature corresponding to the sub-image spatial feature and the previous sub-image spatial feature.

6. An electronic device, comprising a processor and a memory, the memory storing at least one program code, and at least one program code being loaded and executed by the processor to enable the electronic device to implement an image acquisition model training method including:

acquiring a label image pair of a sample image, the label image pair comprising a first label image and a second label image, the first label image being a heat map of the sample image in image space, and the second label image being a heat map of the sample image in Hough space;

acquiring, by the electronic device, a predicted image pair of the sample image according to a first network model, the predicted image pair comprising a first predicted image and a second predicted image, the first predicted image being a heat map of the sample image obtained by the first network model in the image space, and the second predicted image being a heat map of the sample image obtained by the first network model in the Hough space, further comprising:

acquiring, by the electronic device, a first image spatial feature of the sample image in the image space, the first image spatial feature comprising at least two sub-image spatial features;

determining, by the electronic device, the first predicted image based on the at least two sub-image spatial features;

determining, by the electronic device, a first Hough spatial feature of the sample image in the Hough space based on the first image spatial feature; and determining, by the electronic device, the second predicted image based on the first Hough spatial feature;

adjusting the first network model based on the label image pair and the predicted image pair to obtain a second network model, so as to reduce a difference, obtained according to the second network model, between the predicted image pair and the label image pair; and determining the second network model as an image acquisition model in response to the second network model satisfying a training termination condition.

7. The electronic device according to claim 6, wherein the determining the first Hough spatial feature of the sample image in the Hough space based on the first image spatial feature comprises:

performing rectification on the first image spatial feature to obtain a rectified first image spatial feature; and determining the first Hough spatial feature based on the rectified first image spatial feature.

8. The electronic device according to claim 6, wherein the method further comprises:

determining the second image spatial feature of the sample image in the image space based on the first Hough spatial feature and the first image spatial feature;

determining a third predicted image based on the second image spatial feature, the third predicted image being a heat map of the sample image obtained by the first network model in the image space;

determining a second Hough spatial feature of the sample image in the Hough space based on the second image spatial feature;

determining a fourth predicted image based on the second Hough spatial feature, the fourth predicted image being a heat map of the sample image obtained by the first network model in the Hough space;

adjusting the first network model based on the label image pair, the predicted image pair, the third predicted image, and the fourth predicted image to obtain the second network model, so as to reduce the difference, obtained according to the second network model, between the predicted image pair and the label image pair, and reduce the difference between an image pair composed of the third predicted image and the fourth predicted image and the label image pair.

9. The electronic device according to claim 6, wherein the determining the first Hough spatial feature based on the first image spatial feature comprises:

for a sub-image spatial feature of the at least two sub-image spatial features, determining, by the electronic device, a sub-Hough spatial feature corresponding to the sub-image spatial feature, the first Hough spatial feature comprising the sub-Hough spatial feature corresponding to the sub-image spatial feature; and determining the second predicted image based on the sub-Hough spatial feature corresponding to each sub-image spatial feature.

10. The electronic device according to claim 6, wherein the determining the first Hough spatial feature based on the first image spatial feature comprises:

for a sub-image spatial feature other than the first sub-image spatial feature of the at least two sub-image spatial features, determining a second fused feature corresponding to the sub-image spatial feature based on the sub-image spatial feature and a previous sub-image spatial feature of the sub-image spatial feature; and determining, by the electronic device, a sub-Hough spatial feature corresponding to the sub-image spatial feature based on the second fused feature corresponding to the sub-image spatial feature and the previous sub-image spatial feature.

11. A non-transitory computer-readable storage medium, storing at least one program code, and the at least one program code being loaded and executed by a processor of an electronic device to enable the electronic device to implement an image acquisition model training method including:

acquiring a label image pair of a sample image, the label image pair comprising a first label image and a second label image, the first label image being a heat map of the sample image in image space, and the second label image being a heat map of the sample image in Hough space;

acquiring, by the electronic device, a predicted image pair of the sample image according to a first network model, the predicted image pair comprising a first predicted image and a second predicted image, the first predicted image being a heat map of the sample image obtained by the first network model in the image space, and the second predicted image being a heat map of the sample image obtained by the first network model in the Hough space, further comprising:

acquiring, by the electronic device, a first image spatial feature of the sample image in the image space, the first image spatial feature comprising at least two sub-image spatial features;

determining, by the electronic device, the first predicted image based on the at least two sub-image spatial features;

determining, by the electronic device, a first Hough spatial feature of the sample image in the Hough space based on the first image spatial feature; and determining, by the electronic device, the second predicted image based on the first Hough spatial feature;

adjusting the first network model based on the label image pair and the predicted image pair to obtain a second network model, so as to reduce a difference, obtained according to the second network model, between the predicted image pair and the label image pair; and determining the second network model as an image acquisition model in response to the second network model satisfying a training termination condition.

12. The non-transitory computer-readable storage medium according to claim 11, wherein the determining the first Hough spatial feature of the sample image in the Hough space based on the first image spatial feature comprises:

performing rectification on the first image spatial feature to obtain a rectified first image spatial feature; and determining the first Hough spatial feature based on the rectified first image spatial feature.

13. The non-transitory computer-readable storage medium according to claim 11, wherein the method further comprises:

determining the second image spatial feature of the sample image in the image space based on the first Hough spatial feature and the first image spatial feature;

determining a third predicted image based on the second image spatial feature, the third predicted image being a heat map of the sample image obtained by the first network model in the image space;

determining a second Hough spatial feature of the sample image in the Hough space based on the second image spatial feature;

determining a fourth predicted image based on the second Hough spatial feature, the fourth predicted image being a heat map of the sample image obtained by the first network model in the Hough space;

adjusting the first network model based on the label image pair, the predicted image pair, the third predicted image, and the fourth predicted image to obtain the second network model, so as to reduce the difference, obtained according to the second network model, between the predicted image pair and the label image pair, and reduce the difference between an image pair composed of the third predicted image and the fourth predicted image and the label image pair.

14. The non-transitory computer-readable storage medium according to claim 11, wherein the determining the first Hough spatial feature based on the first image spatial feature comprises:

for a sub-image spatial feature other than the first sub-image spatial feature of the at least two sub-image spatial features, determining a second fused feature corresponding to the sub-image spatial feature based on the sub-image spatial feature and a previous sub-image spatial feature of the sub-image spatial feature; and determining a sub-Hough spatial feature corresponding to the sub-image spatial feature based on the second fused feature corresponding to the sub-image spatial feature and the previous sub-image spatial feature.

* * * * *